(12) United States Patent
Xie

(10) Patent No.: US 10,938,983 B2
(45) Date of Patent: Mar. 2, 2021

(54) COMMUNICATION METHOD AND SERVER

(71) Applicant: Alibaba Group Holding Limited, Grand Cayman (KY)

(72) Inventor: Daocheng Xie, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 231 days.

(21) Appl. No.: 15/097,238

(22) Filed: Apr. 12, 2016

(65) Prior Publication Data
US 2016/0301663 A1 Oct. 13, 2016

(30) Foreign Application Priority Data
Apr. 13, 2015 (CN) .......................... 201510173923.1

(51) Int. Cl.
*H04M 3/42* (2006.01)
*H04M 3/22* (2006.01)
(52) U.S. Cl.
CPC ....... *H04M 3/42008* (2013.01); *H04M 3/229* (2013.01); *H04M 3/42059* (2013.01); *H04M 3/42102* (2013.01)
(58) Field of Classification Search
CPC ............. H04M 3/229; H04M 3/42008; H04M 3/42059; H04M 3/42102
USPC ........................................................ 370/259
See application file for complete search history.

(56) References Cited
U.S. PATENT DOCUMENTS 6,567,848 B1 5/2003 Kusuda et al.
8,676,181 B2 3/2014 Pratt et al.
2001/0029485 A1 10/2001 Brody et al.
2002/0136167 A1 9/2002 Steele et al.
2003/0191676 A1 10/2003 Templeton
2005/0076124 A1 4/2005 Enderlein et al.
(Continued)

FOREIGN PATENT DOCUMENTS

CN 1424842 A 6/2003
CN 101089888 A 12/2007
(Continued)

OTHER PUBLICATIONS

PCT Search Report and Written Opinion dated Jul. 26, 2016 for PCT Application PCT/US16/27160, 7 pages.
(Continued)

*Primary Examiner* — Mark H Rinehart
*Assistant Examiner* — Kokou R Detse
(74) *Attorney, Agent, or Firm* — Lee & Hayes, P.C.

(57) ABSTRACT

A communication method includes receiving a query request sent by a basic communication server, the query request including at least one of a current calling number or an intermediate communication number; finding target binding information corresponding to a communication number included in the query request from stored binding information according to the query request, the target binding information including a calling number and a called number that are bound to the intermediate communication number; setting up number information, the number information including at least the called number included in the target binding information; and sending the number information to the basic communication server. The communication method can effectively protect the privacy of users.

15 Claims, 14 Drawing Sheets

(56) References Cited

U.S. PATENT DOCUMENTS

| | | |
|---|---|---|
| 2005/0086160 A1 | 4/2005 | Wong et al. |
| 2005/0131757 A1 | 6/2005 | Chan et al. |
| 2005/0246419 A1 | 11/2005 | Jaatinen |
| 2007/0047478 A1 | 3/2007 | Balachandran et al. |
| 2007/0286208 A1 | 12/2007 | Kanada et al. |
| 2008/0084982 A1 | 4/2008 | Chatterjee |
| 2009/0124270 A1 | 5/2009 | Kelley |
| 2009/0305691 A1 | 12/2009 | Suetsugu et al. |
| 2010/0216494 A1 | 8/2010 | Abdel-Moiti Moik |
| 2010/0312903 A1 | 12/2010 | Miyata |
| 2011/0159861 A1* | 6/2011 | Pratt ............ H04L 63/0407 455/417 |
| 2012/0100830 A1* | 4/2012 | Barber ............ H04M 3/42008 455/410 |
| 2012/0207297 A1 | 8/2012 | Tian et al. |
| 2012/0246696 A1 | 9/2012 | Boukobza |
| 2014/0146954 A1* | 5/2014 | Noldus ............ H04L 61/2539 379/114.01 |
| 2015/0092612 A1* | 4/2015 | Zhu ............ H04L 65/1046 370/259 |
| 2015/0242645 A1 | 8/2015 | Burger et al. |
| 2015/0302413 A1 | 10/2015 | Dua |
| 2016/0301664 A1 | 10/2016 | Xie |
| 2016/0301800 A1 | 10/2016 | Xie |

FOREIGN PATENT DOCUMENTS

| | | |
|---|---|---|
| CN | 101159778 A | 4/2008 |
| CN | 101827355 A | 9/2010 |
| CN | 102624995 A | 8/2012 |
| CN | 103391377 A | 11/2013 |
| CN | 103477618 A | 12/2013 |
| CN | 104080069 A | 10/2014 |
| CN | 104093136 A | 10/2014 |
| CN | 104104681 A | 10/2014 |
| JP | 2010087762 A | 4/2010 |
| JP | 2013135417 A | 7/2013 |

OTHER PUBLICATIONS

Office action for U.S. Appl. No. 15/097,220, dated Oct. 19, 2017, Xie, "Method and Server for Securing Communication Number", 19 pages.
Office Action for U.S. Appl. No. 15/097,195, Xie, dated Jun. 14, 2017, "Method and Server for Securing Communication Number", 10 pages.
PCT Search Report and Written Opinion dated Jul. 14, 2016 for PCT Application No. PCT/US16/27158, 11 pages.
PCT Search Report and Written Opinion dated Jul. 15, 2016 for PCT Application No. PCT/US16/27152, 12 pages.
Office Action for U.S. Appl. No. 15/097,195, Xie, dated Dec. 28, 2017, "Method and Server for Securing Communication Number", 10 pages.
Office Action for U.S. Appl. No. 15/097,220, dated May 16, 2018, Xie, "Method and Server for Securing Communication Number", 21 pages.
Office Action for U.S. Appl. No. 15/097,220, dated Sep. 10, 2018, Xie, "Method and Server for Securing Communication Number", 19 pages.
Chinese 1st Office Action dated Sep. 30, 2018 for Chinese Patent Application No. 20150172447.1, 8 pages.
English-language translation of First Office Action dated Aug. 1, 2018 by The State Intellectual Property Office of the People's Republic of China in corresponding Application No. 201510173923.1 (13 pages).
Chinese Office Action dated Dec. 5, 2018 for Chinese patent application No. 201510173924.6, a counerpart foreign application of U.S. Appl. No. 15/097,220, 9 pages.
English-language translation of Second Office Action dated Apr. 2, 2019 by The State Intellectual Property Office of the People's Republic of China in corresponding Application No. 201510173923. 1, (23 pages).
Chinese Search Report dated Jul. 23, 2018 for Chinese Application No. 201510173923.1, 1 page.
Chinese Search Report dated Sep. 10, 2018 for Chinese Patent Application No. 201510172447.1, 2 pages.
Chinese Search Report dated Nov. 27, 2018 for CN Patent Application No. 201510173924.6, 2 pages.
Chinese Supplementary Search Report dated Apr. 13, 2015 for Chinese Patent Application No. 201510173923.1, a counterpart foreign application of U.S. Appl. No. 15/097,238, 1 page.
Final Office Action dated Apr. 4, 2019 for U.S. Appl. No. 15/097,220 "Method and Server for Securing Communication Number" Xie, 17 pages.
Japanese Office Action dated Jan. 7, 2020 for Japanese Patent Application No. 2017-549407, a counterpart of U.S. Appl. No. 15/097,238, 8 pages.
Notice of Reasons for Refusal dated Oct. 6, 2020 by the Japan Patent Office in corresponding Application No. 2017-549407, 3 pages.
English-language translation of Notice of Reasons for Refusal dated Oct. 6, 2020 by the Japan Patent Office in corresponding Application No. 2017-549407, 3 pages.

* cited by examiner

COMMUNICATION METHOD AND SERVER

CROSS REFERENCE TO RELATED PATENT APPLICATION

This application claims foreign priority to Chinese Patent Application No. 201510173923.1 filed on Apr. 13, 2015, entitled "Communication Method and Server", which is hereby incorporated by reference in its entirety. This application is also related to commonly-assigned application U.S. patent application Ser. No. 15/097,195, entitled "METHOD AND SERVER FOR SECURING COMMUNICATION NUMBER", filed on Apr. 12, 2016, which claims the priority of Chinese Patent Application Number 201510172447.1 filed Apr. 13, 2015, entitled "METHOD AND APPARATUS FOR ORDER DATA INTERACTION," and commonly-assigned application U.S. patent application Ser. No. 15/097,220, entitled "METHOD AND SERVER FOR SECURING COMMUNICATION NUMBER", filed on Apr. 12, 2016, which claims the priority of Chinese Patent Application Number 201510173924.6 filed on Apr. 13, 2015, entitled "METHOD AND APPARATUS FOR ORDER DATA INTERACTION." The contents of the above commonly-assigned applications are hereby incorporated by reference.

TECHNICAL FIELD

The present disclosure relates to the field of communications, and in particular, to a communication method and a server.

BACKGROUND

Communication number, such as a telephone number, is the privacy of user that sometimes has to be provided to third parties for communication. The technical problem concerns how to conduct the communication with third parties without disclosing the user's communication number to the third parties.

Privacy usually refers to certain personal information that is not wanted to be known by others or others are not convenient to know. With the development of social civilization, lots of situations where privacy is leaked appear, causing privacy protection to receive more extensive attention.

A phone number is a special kind of privacy, and people may selectively tell their phone numbers to others to maintain interpersonal communication, but do not hope their phone numbers to be spread arbitrarily which may result in a flood of phone frauds, a variety of marketing advertisements, spam messages and other consequences.

However, it is difficult for existing network systems to properly protect privacy of users. For example, in daily lives, people may often do online shopping, and the existing network systems require users to provide phone numbers to facilitate communication with online stores and logistics companies. In this way, the online stores and the logistics companies get customers' names and telephone numbers through the network systems. So, the online stores and the logistics companies will accumulate a large number of contact information of customers after a long period of operation. If operation and management fails, it is likely that a leakage of contact information of customers will occur, that is, the privacy of the customers is leaked. Thus, the existing network systems have a greater risk of leaking user privacy.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of embodiments of the present disclosure is to provide a communication method and a server that can protect user privacy.

In order to solve the aforementioned technical problem, the present disclosure provides a communication method, including: receiving a query request sent by a basic communication server, the query request including at least one of a current calling number or an intermediate communication number; finding target binding information corresponding to the communication number included in the query request from stored binding information according to the query request, the target binding information including a calling number and a called number bound to the intermediate communication number; setting up number information, the number information at least including the called number included in the target binding information; and sending the number information to the basic communication server.

The present disclosure further provides a server, including: a query request receiving module used for receiving a query request sent by a basic communication server, the query request including at least one of a current calling number or an intermediate communication number; a query module used for finding target binding information corresponding to the communication number included in the query request from stored binding information according to the query request, the target binding information including a calling number and a called number bound to the intermediate communication number; and an information setup module used for setting up number information and sending the number information to the basic communication server, wherein the number information at least includes the called number included in the target binding information.

The present disclosure further provides a communication method, including: receiving a call request specific to an intermediate communication number, the call request including a current calling number; sending a query request to a number management server, the query request including at least one of the current calling number or the intermediate communication number; receiving number information returned by the number management server, the number information including a predetermined called number; and converting the call request into a call to a communication device that uses the predetermined called number, a calling number provided to the communication device being the intermediate communication number.

The present disclosure further provides a server, including: a call request receiving module used for receiving a call request specific to an intermediate communication number, the call request including a current calling number; a query request sending module used for sending a query request to a number management server, the query request including at least one of the current calling number or the intermediate communication number; a number information receiving module used for receiving number information returned by the number management server, the number information including a predetermined called number; and a calling module used for converting the call request into a call to a communication device that uses the predetermined called number, a current calling number provided to the communication device being the intermediate communication number.

The present disclosure further provides a communication method, including: receiving an intermediate communication number request and obtaining a first communication number and a second communication number according to the intermediate communication number request; allocating an intermediate communication number; setting up binding information for the intermediate communication number, the first communication number and the second communication number; and receiving a call request of the first communication number to the intermediate communication number, and converting the call request into a call of the first communication number to the second communication number, a current calling number provided to the second communication number being the intermediate communication number.

The present disclosure further provides a server, including: a number request receiving module used for receiving an intermediate communication number request, with a first communication number and a second communication number being obtained according to the intermediate communication number request; a number allocation module used for allocating an intermediate communication number; a binding module used for setting up binding information for the intermediate communication number, the first communication number and the second communication number; and a calling module used for receiving a call request of the first communication number to the intermediate communication number and converting the call request into a call of the first communication number to the second communication number, a current calling number provided to the second communication number being the intermediate communication number.

The present disclosure further provides a communication method, including: receiving an intermediate communication number request and obtaining a first communication number and a second communication number according to the intermediate communication number request; allocating an intermediate communication number and correlating the intermediate communication number with the first communication number and the second communication number; and sending correlation information to a basic communication server, the correlation information including the intermediate communication number, the first communication number and the second communication number.

The present disclosure further provides a communication method, including: receiving correlation information that includes a first communication number, a second communication number and an intermediate communication number; correlating the intermediate communication number with the first communication number and the second communication number; and receiving a call request of the first communication number to the intermediate communication number and converting the call request into a call of the first communication number to the second communication number, a current calling number provided to the second communication number being the intermediate communication number.

As can be seen from technical solutions of embodiments of the present disclosure described above, the present disclosure is able to achieve binding of communication numbers of two users to an intermediate communication number, and allow each user to establish communication with another user by sending a call request to the intermediate communication number without knowing a communication number of the other user. In this way, during a transaction process, both parties that are involved can conduct communications by knowing an intermediate communication number only, thereby effectively avoiding a leakage of communication numbers of users, and effectively protecting the privacy of the users.

BRIEF DESCRIPTION OF THE DRAWINGS

In order to illustrate the technical solutions of the embodiments of the present disclosure or existing technologies more clearly, accompanying drawings needed for describing the embodiments or the existing technologies are introduced briefly herein. Apparently, the described accompanying drawings represent only some embodiments that are recorded in the present disclosure. One of ordinary skill in the art can obtain other drawings based on the accompanying drawings without making any creative effort.

DETAILED DESCRIPTION

In order to enable one skilled in the art to understand the technical solutions of the present disclosure in a better manner, the technical solutions in the embodiments of the present disclosure will be clearly and completely described herein with reference to the accompanying drawings of the embodiments of the present disclosure. Apparently, the described embodiments represent only a part and not all of the embodiments of the present disclosure. All other embodiments derived by one of ordinary skill in the art based on the embodiments of the present disclosure without making any creative effort shall fall within the scope of protection of the present disclosure.

Figure 1:
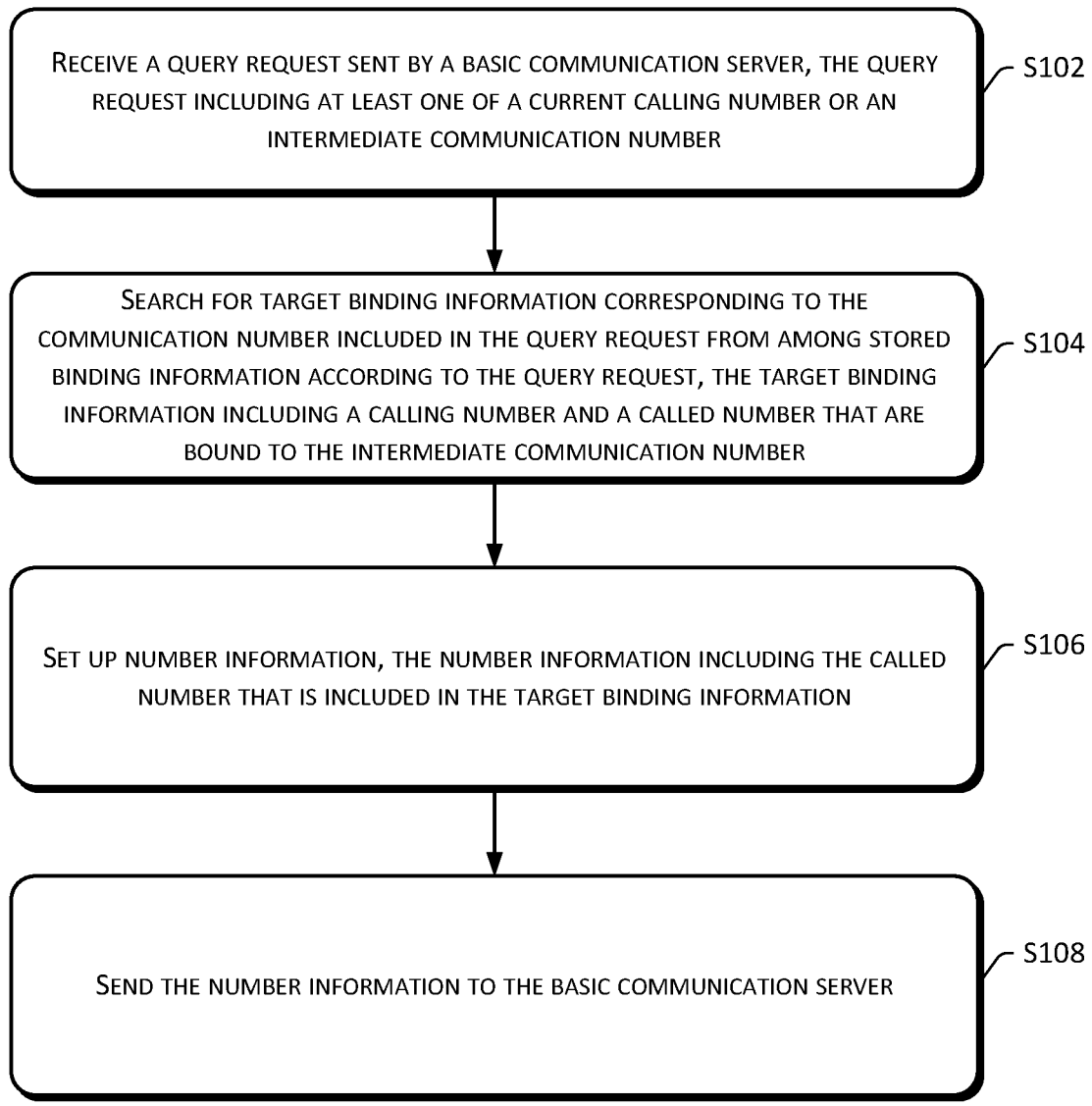
FIG. 1 is a flowchart of a communication method according to an embodiment of the present disclosure.

FIG. 1 illustrates a communication method according to an embodiment of the present disclosure, which includes the following method blocks.

S102 receives a query request sent by a basic communication server, the query request including at least one of a current calling number or an intermediate communication number.

In implementations, a basic communication server may be a server of a telecom operator, which may make a call to a communication number according to a call request.

In implementations, a current calling number may be a communication number used by a communication device that initiates a call request to the basic communication server.

In implementations, when a number management server receives a query request, this indicates that the basic communication server receives a call request, and the number management server is needed to perform a further query for binding information according to information included in the query request and to return a communication number according to the binding information for use as a called number of the basic communication server for the current call request.

In implementations, the query request may be a character string having a representation of a predetermined meaning. The query request includes at least one of a current calling number or an intermediate communication number. The current calling number or the intermediate communication number may be a portion of content of the query request. Alternatively, the current calling number and the intermediate communication number may be a portion of content of the query request. Alternatively, the current calling number or the intermediate communication number may serve as an attachment to the query request, or the current calling number and the intermediate communication number may serve an attachment to the query request.

In implementations, the intermediate communication number may be a communication number having a predetermined format. Alternatively, an intermediate communication number set may be set up, and a communication number that is used as an intermediate communication number is stored into the intermediate communication number set.

S104 searches for target binding information corresponding to the communication number included in the query request from among stored binding information according to the query request, the target binding information including a calling number and a called number that are bound to the intermediate communication number.

In implementations, the calling number may be a first communication number or a second communication number, and the called number may be the second communication number or the first communication number. It can be understood that the first communication number and the second communication number may serve as a calling number or a called number respectively. The binding information is used for indicating an association relationship among the first communication number, the second communication number and the intermediate communication number. Furthermore, any one or more of the first communication number, the second communication number and the intermediate communication number can be obtained based on the binding information. Moreover, the binding information can be found based on any one or more of the first communication number, the second communication number and the intermediate communication number.

In implementations, an exemplary form of the binding information may include, for example, storing first communication numbers, second communication numbers and intermediate communication numbers correlatively with one another in a form of a data table. The first communication numbers are stored in one column of the data table, the second communication numbers are stored in another column, and the intermediate communication numbers are stored in a third column. A first communication number, a second communication number and an intermediate communication number that are correlated are located in a same row, that is, a row in the data table may be a piece of binding information. Alternatively, respective identity information correspond to the first communication number and the second communication number is correspondingly stored together with the intermediate communication number, so that the first communication number and the second communication number can be obtained based on the respective identity information.

In implementations, the number management server searches and determines target binding information based on a communication number included in the query request. The current calling number may be compared and matched with first communication number(s) and second communication number(s) in the stored binding information. In other words, each of the first communication number and the second communication number may serve as the current calling number. In implementations, in response to finding that the current calling number is the same as a first communication number or a second communication number of a certain piece of binding information, the piece of binding information can be treated as the target binding information. In implementations, in response to finding that the intermediate communication number included in the query request is the same as an intermediate communication number of a certain piece of binding information, that piece of binding information can be set as the target binding information. In implementations, in response to finding that the current calling number included in the query request is the same as a first communication number or a second communication number of a certain piece of binding information and the intermediate communication number in the query request is the same as an intermediate communication number in that binding information, that binding information can be considered as the target binding information.

S106 sets up number information, the number information including the called number that is included in the target binding information.

S108 sends the number information to the basic communication server.

In implementations, the number information is used for returning a communication number to the basic communication server, to enable the basic communication server to take the communication number as a called number of a current call request.

In implementations, the number information includes at least the called number that is included in the target binding information. For example, the current calling number included in the query request may be the same as the first communication number. At this point, the second communication number is included in the number information that is returned, so that the basic communication server can convert the current call request into a call directed to the second communication number. As such, the first communication number, the second communication number and the intermediate communication number form a ternary binding relationship through the number management server. When a call request is sent to the intermediate communication number with the first communication number as a calling number, the call request may be converted to a call to the second communication number. In this way, a communication device that uses the first communication number can establish communication with a communication device that uses the second communication number without the need of knowing the second communication number. Moreover, when a call request is sent to an intermediate number with the second communication number serving as a calling number, the number information may include the first communication number, for example, so that the basic communication server can convert the call request of the second communication number into a call to the first communication number. As can be seen, the present embodiment effectively avoids a leakage of phone numbers usually used by users through a ternary binding relationship, and thus effectively protects the privacy of the users.

In implementations, in correspondence to a query request that includes a current calling number, corresponding number information includes one of a first communication number and a second communication number which is different from the current calling number. In correspondence to a query request that only includes an intermediate communication number, corresponding number information may include a first communication number and a second communication number in target binding information. In this way, after receiving the first communication number and the second communication number, the basic communication server may perform a comparison to obtain a communication number which is different from among the current calling number from the first communication number and the second communication number, and use the communication number as a called number.

Figure 2:
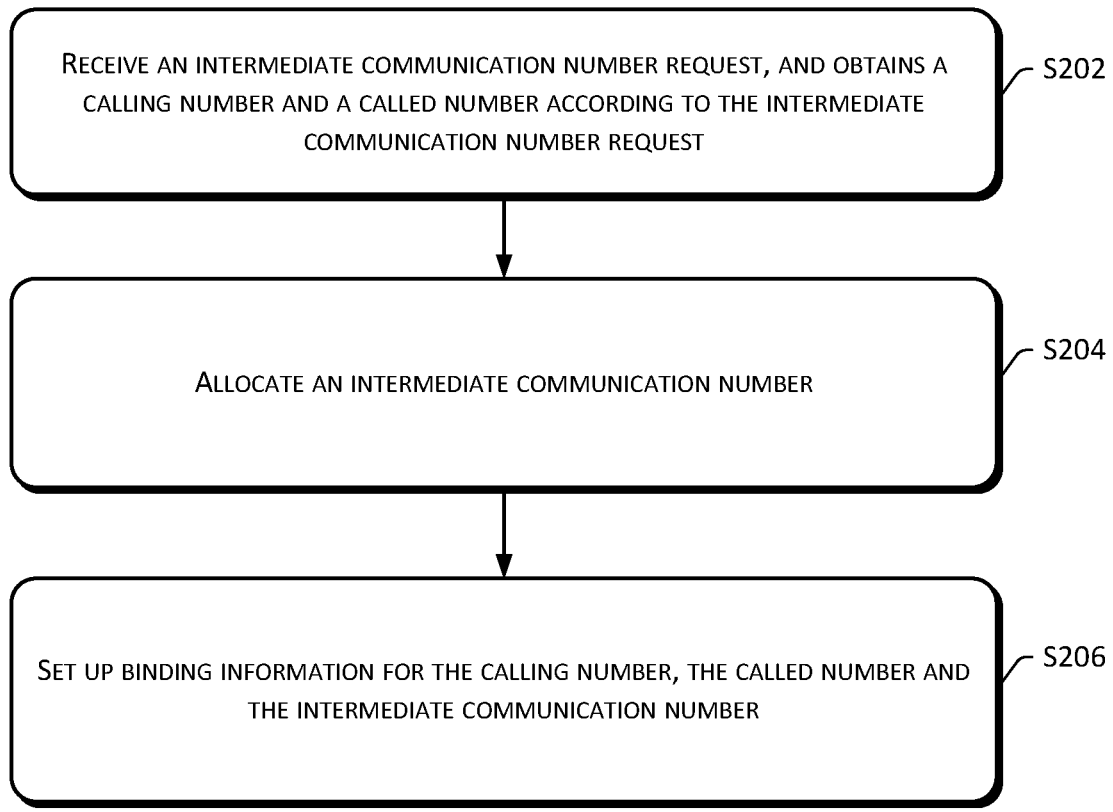
FIG. 2 is a flowchart of a communication method according to an embodiment of the present disclosure.

Referring to FIG. 2, in an embodiment, the communication method may further include the following method blocks.

S202 receives an intermediate communication number request, and obtains a calling number and a called number according to the intermediate communication number request.

In implementations, the number management server receives an intermediate communication number request sent from a communication device. The communication device may be a desktop computer, a notebook computer, a tablet computer, a smartphone, a server and a smart wearable device.

In implementations, a receipt of an intermediate communication number request may represent a request for allocating an intermediate communication number for a first communication number and a second communication number. A such, during a process of conducting communications between a communication device that uses the first communication number and a communication device that uses the second communication number, both parties can establish the communications merely through the intermediate communication number without the need of knowing a real communication number of the other party. In other words, the device that uses the first communication number does not need to know the second communication number, and the device that uses the second communication number does not need to know the first communication number, thereby effectively protecting the privacy of both communication parties.

In implementations, the intermediate communication number request may be a character string having a representation of a predetermined meaning. A receipt of the character string indicates a request for allocating the intermediate communication number. Apparently, the number management server may have a predetermined port that is set up to receive the intermediate communication number request. In this case, the intermediate communication number request may not have a predetermined form, and a receipt of data at the predetermined port indicates that the intermediate communication number request is received.

In implementations, an approach of obtaining a first communication number and a second communication number according to the intermediate communication number request may include as follows. The intermediate communication number request includes the first communication number and the second communication number, where the first communication number and the second communication number may be a portion of the intermediate communication number request or an attachment to the intermediate communication number request. The intermediate communication number request includes respective identity information corresponding to the first communication number and the second communication number, and the corresponding first communication number and the corresponding second communication number are searched for from a database that is locally stored based on the respective identity information. The first communication number and the second communication number may be obtained at different time points. For example, when the intermediate communication number request includes the first communication number, the communication device that uses the second communication number provides the second communication number to the number management server or provides identity information to the number management server due to a need in a transaction process, so that the number management server can obtain the second communication number from stored data based on the identity information.

In implementations, the first communication number and the second communication number may be respective phone numbers usually used by different users. The first communication number and the second communication number may be numbers of fixed-line telephones, or may be numbers of mobile phones, which are not limited to any number segment.

S204 allocates an intermediate communication number.

In implementations, the number management server may locally store an intermediate communication number set, and select an intermediate communication number from the intermediate communication number set according to predetermined rule(s). The number management server may also be provided with a predetermined algorithm, and obtain an intermediate communication number according to the predetermined algorithm. Furthermore, the intermediate communication number may be a number of a segment. For example, a number between "95000000000-95011111111" may be used as the intermediate communication number.

In implementations, S202 and S204 are not limited to be executed in a sequential order, and may also be performed in an overlapping manner. For example, when the intermediate communication number request includes a first communication number, an intermediate communication number is allocated, and a second communication number may not have been obtained at this point yet.

S206 sets up binding information for the calling number, the called number and the intermediate communication number.

In implementations, an exemplary form of the binding information may include, for example, storing first communication numbers, second communication numbers and intermediate communication numbers associatively with one another in a form of a data table. The first communication numbers are stored in one column of the data table, the second communication numbers are stored in another column, and the intermediate communication numbers are stored in a third column. A first communication number, a second communication number and an intermediate communication number that are correlated are located in a same row, that is, a row in the data table may be a piece of binding information. The binding information can be set up by adding a new row in the data table. Alternatively, respective identity information correspond to the first communication number and the second communication number are correspondingly stored together with the intermediate communication number, so that the first communication number and the second communication number can be obtained based on the respective identity information.

In implementations, the communication method may further include: sending a predetermined identification to the basic communication server when the communication number included in the query request is not found in any binding information that is stored, the predetermined identification indicating that the current calling number is not bound to the intermediate communication number.

In implementations, when the binding information stored by the number management server does not have the communication number included in the query request, this indicates that the current calling number included in the query request is not bound to the intermediate communication number and another communication number, or the intermediate communication number included in the query request is not bound to other communication numbers. In this case, a predetermined identification is sent to the basic communication server to inform the basic communication server that the current calling number is not bound to the intermediate communication number.

In implementations, the predetermined identification may be a character string having a representation of a predetermined meaning or a character string having a predetermined format. When the basic communication server receives this predetermined identification, this indicates that the current calling number is not bound to the intermediate communication number.

Figure 3:
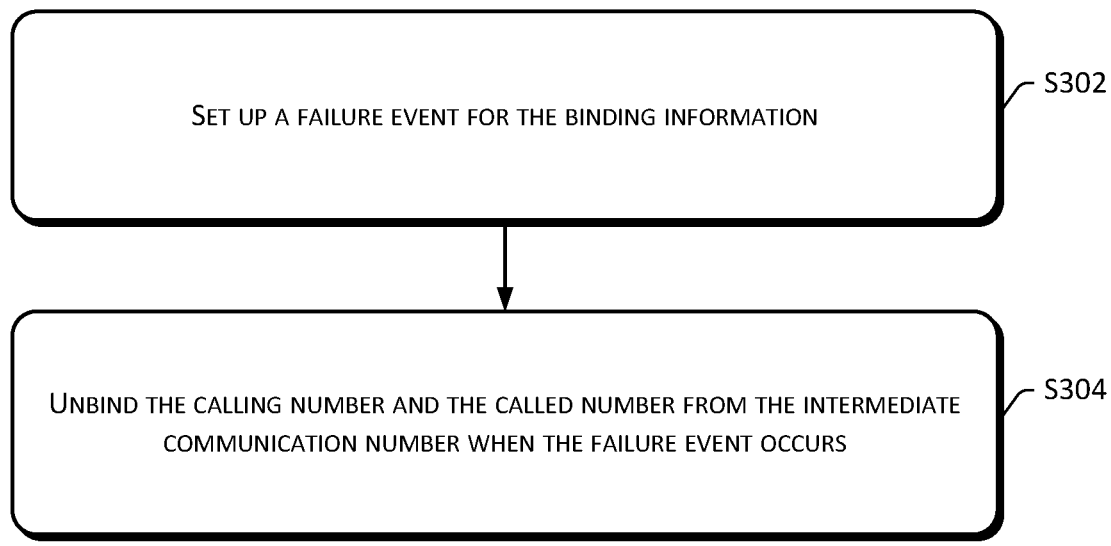
FIG. 3 is a flowchart of a communication method according to an embodiment of the present disclosure.

Referring to FIG. 3, in an embodiment, the communication method may further include the following method blocks.

S302 sets up a failure event for the binding information.

S304 unbinds the calling number and the called number from the intermediate communication number when the failure event occurs.

In implementations, when the first communication number and the second communication number are released from binding with the intermediate communication number, the number management server cancels corresponding stored binding information.

In implementations, by setting up a failure event for binding information of a first communication number, a second communication number and an intermediate communication number, a binding of these three entities is released when the failure event occurs. Therefore, a user that uses the first communication number and a user that uses the second communication number are unable to contact with each other again through the intermediate communication number after an associated transaction process is ended, thus effectively preventing the user that uses the first communication number or the second communication number from harassing the other by calling the intermediate communication number again, after the transaction process is ended.

In implementations, an expiration time for the binding information may be set. In other words, a failure event may include a current time length of the binding information exceeding the expiration time, as counted from the time when the binding information is set up. The failure event may further include receiving an unbinding request, and the unbinding request may be sent by a user communication device or a business server that is used for processing transaction logics. Apparently, the failure event may further include other events. One skilled in the art may make other modifications under the teaching of the technical essences of the present disclosure, which shall be covered within the scope of protection of the present disclosure as long as functions and effects thereof are the same as or similar to those of the present disclosure.

In implementations, the failure event includes a current time being greater than an effective time that is set. In implementations, an effective time may be set for the binding information. The effective time may be a specific time, and when the current time is greater than the specific time, this indicates that the current time goes past the set effective time. For example, an effective time is 24:00 on Mar. 10, 2015. After the current time goes past that time, the binding information automatically becomes ineffective. Alternatively, the effective time may be a time length, and the time length may be counted from the time when the binding information is set up, or may be counted from the time when the number management server receives the intermediate communication number request. When a difference between the current time and the time when the counting begins is greater than a set time length, this indicates that the current time goes past the set effective time. For example, the time length may be 10 days, and the time when the binding information is set up is 12:00 on Feb. 11, 2015. When a difference between the current time and the time when the binding information is set up is greater than 10 days, the binding information is invalid.

In implementations, the failure event includes receiving an unbinding request, and one or more of the first communication number, the second communication number and the intermediate communication number can be obtained according to the unbinding request.

In implementations, the unbinding request may be a character string having a representation of a predetermined meaning, and may also have a predetermined format. A user communication device may send out the unbinding request. Additionally or alternatively, a business server that processes transaction logics may send out the unbinding request.

In implementations, the unbinding request may include at least one of the first communication number, the second communication number or the intermediate communication number. A way of inclusion may include at least one of the first communication number, the second communication number or the intermediate communication number being a portion of content of the unbinding request, or at least one of the first communication number, the second communication number or the intermediate communication number being an attachment associated with the unbinding request. The unbinding request may further include identity information corresponding to at least one of the first communication number or the second communication number, and the identity information may be information of a user that uses a communication number. The communication number corresponding thereto can be obtained from stored data using the identity information. Based on one of the first communication number, the second communication number and the intermediate communication number, binding information corresponding to these three entities can be obtained from stored binding information, so that a binding among them can be released by deleting the binding information.

Figure 4:
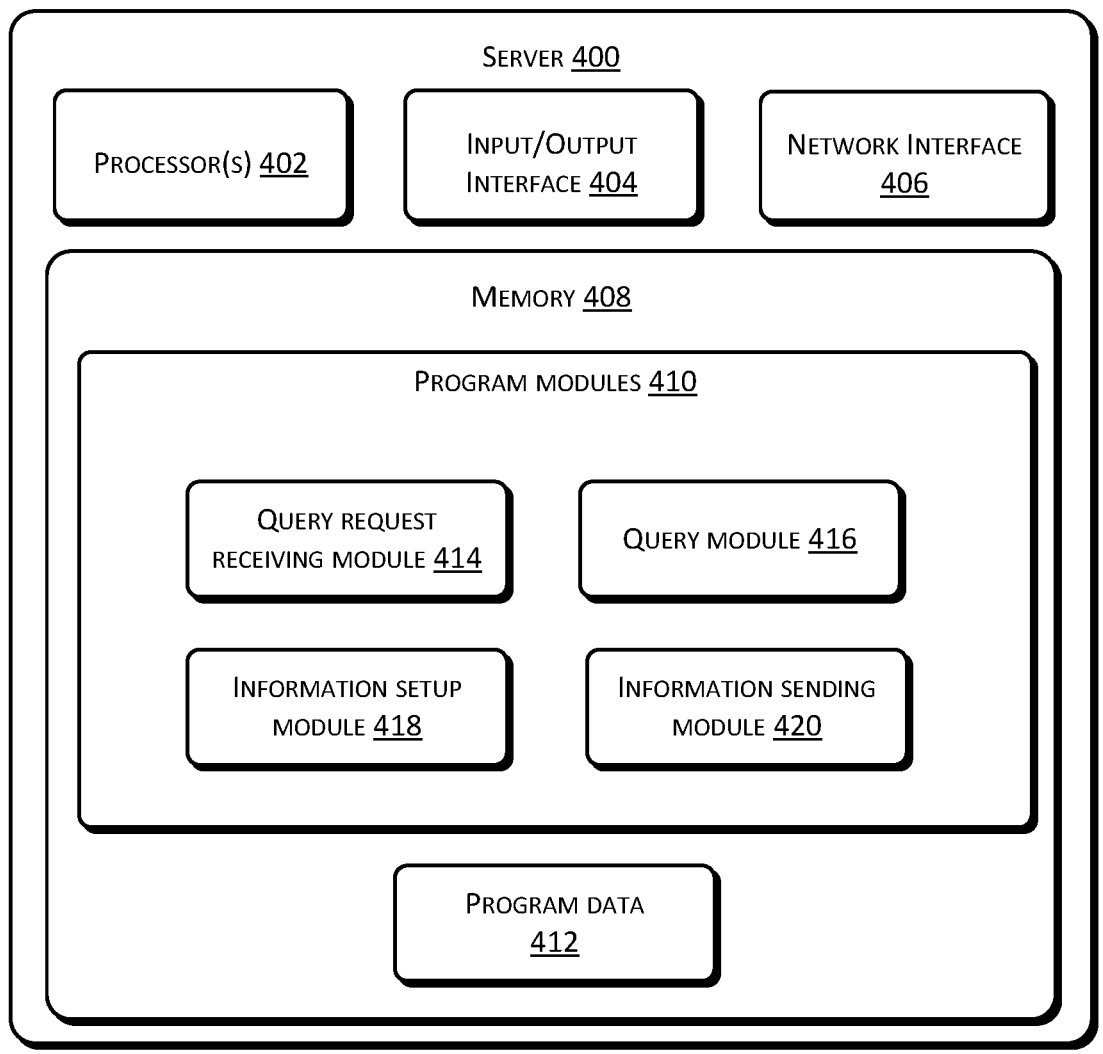
FIG. 4 is a modular diagram of a server according to an embodiment of the present disclosure.

Referring to FIG. 4, an embodiment of the present disclosure further provides a server 400. In implementations, the server 400 may include one or more computing devices. In implementations, the server 400 may include one or more processors 402, an input/output (I/O) interface 404, a network interface 406 and memory 408.

The memory 408 may include a form of computer-readable media, e.g., a non-permanent storage device, random-access memory (RAM) and/or a nonvolatile internal storage, such as read-only memory (ROM) or flash RAM. The memory 408 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 408 may include program modules 410 and program data 412. The program modules 410 may include a query request receiving module 414, a query module 416, an information setup module 418 and an information sending module 420.

The query request receiving module 414 receives a query request sent from a basic communication server, the query request including at least one of a current calling number or an intermediate communication number.

In implementations, the basic communication server may be a server of a telecom operator, which may make a call to a communication number according to a call request.

In implementations, the query request receiving module 414 may be a communication terminal that is able to connected to a network and receive information, and may also be software that instructs a communication terminal to operate. The query request receiving module 414 receives a query request, indicating that the basic communication server receives a call request. The server 400 is needed to further query for binding information according to information included in the query request, and return a communication number according to the binding information to be used as a called number of the basic communication server for the current call request.

In implementations, the query request may be a character string having a representation of a predetermined meaning. The query request includes at least one of a current calling number or an intermediate communication number. The current calling number or the intermediate communication number may be a portion of content of the query request. Alternatively, the current calling number or the intermediate communication number may serve as an attachment associated with the query request. Alternatively, the current calling number and the intermediate communication number may be a portion of content of the query request. Alternatively, the current calling number and the intermediate communication number may serve an attachment associated with the query request.

In implementations, the intermediate communication number may be a communication number having a predetermined format. Alternatively, an intermediate communication number set may be set up, and a communication number that is used as an intermediate communication number is stored into the intermediate communication number set.

The query module 416 searches for target binding information corresponding to the communication number included in the query request from among stored binding information according to the query request, the target binding information including a calling number and a called number that are bound to the intermediate communication number.

In implementations, the calling number may be a first communication number or a second communication number, and the called number may be the second communication number or the first communication number. It can be understood that the first communication number and the second communication number may serve as a calling number or a called number respectively. The binding information is used for indicating an association relationship among the first communication number, the second communication number and the intermediate communication number. Furthermore, any one or more of the first communication number, the second communication number and the intermediate communication number can be obtained based on the binding information. Moreover, the binding information can be found based on any one or more of the first communication number, the second communication number and the intermediate communication number.

In implementations, an exemplary form of the binding information may include, for example, storing and correlating first communication numbers, second communication numbers and intermediate communication numbers with one another in a form of a data table. The first communication numbers are stored in one column of the data table, the second communication numbers are stored in another column, and the intermediate communication numbers are stored in a third column. A first communication number, a second communication number and an intermediate communication number that are correlated are located in a same row, that is, a row in the data table may be a piece of binding information. Alternatively, respective identity information correspond to the first communication number and the second communication number is correspondingly stored together with the intermediate communication number, so that the first communication number and the second communication number can be obtained based on the respective identity information.

In implementations, the query module 416 searches and determines target binding information based on a communication number included in the query request. The current calling number may be compared and matched with first communication number(s) and second communication number(s) in the stored binding information. In other words, each of the first communication number and the second communication number may serve as the current calling number. In implementations, in response to finding that the current calling number is the same as a first communication number or a second communication number of a certain piece of binding information, the piece of binding information can be acted as the target binding information. In implementations, in response to finding that the intermediate communication number included in the query request is the same as an intermediate communication number of a certain piece of binding information, that piece of binding information can be set as the target binding information. In implementations, in response to finding that the current calling number included in the query request is the same as a first communication number or a second communication number of a certain piece of binding information and the intermediate communication number in the query request is the same as an intermediate communication number in that binding information, that binding information can be considered as the target binding information.

The information setup module 418 sets up number information, and the information sending module 420 sends the number information to the basic communication server, where the number information includes at least the called number that is included in the target binding information.

In implementations, the number information is used for returning a communication number to the basic communication server, to enable the basic communication server to take the communication number as a called number of a current call request.

In implementations, the number information includes at least the called number included in the target binding information. For example, the current calling number included in the query request may be the same as the first communication number. At this point, the second communication number is included in the number information that is returned, so that the basic communication server can convert the current call request into a call directed to the second communication number. As such, the first communication number, the second communication number and the intermediate communication number form a ternary binding relationship through the server 400. When a call request is sent to the intermediate communication number with the first communication number as a calling number, the call request may be converted to a call to the second communication number. In this way, a communication device that uses the first communication number can establish communication with a communication device that uses the second communication number without the need of knowing the second communication number. Moreover, when a call request is sent to an intermediate number with the second communication number serving as a calling number, the number information may include the first communication number, for example, so that the basic communication server can convert the call request of the second communication number into a call to the first communication number. As can be seen, the present embodiment effectively avoids a leakage of phone numbers usually used by users through a ternary binding relationship, and thus effectively protects the privacy of the users.

In implementations, in correspondence to a query request that includes a current calling number, corresponding number information includes one of a first communication number and a second communication number which is different from the current calling number. In correspondence to a query request that only includes an intermediate communication number, corresponding number information may include a first communication number and a second communication number in target binding information. In this way, after receiving the first communication number and the second communication number, the basic communication server may perform a comparison to obtain a communication number which is different from among the current calling number from the first communication number and the second communication number, and use the communication number as a called number.

Figure 5:
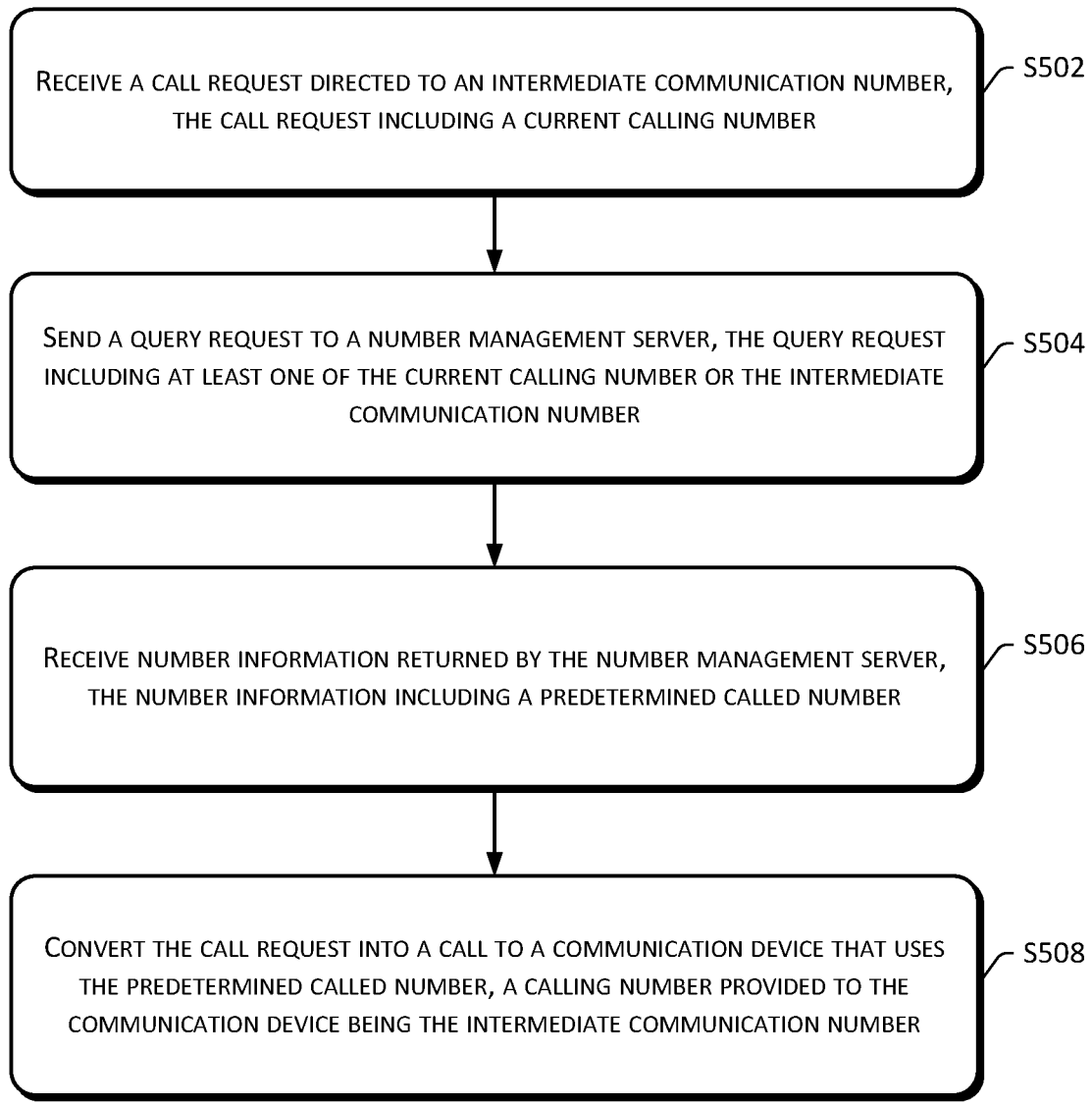
FIG. 5 is a flowchart of a communication method according to an embodiment of the present disclosure.

Referring to FIG. 5, an embodiment of the present disclosure further provides a communication method, which includes the following method blocks.

S502 receives a call request directed to an intermediate communication number, the call request including a current calling number.

In implementations, the call request may be a predetermined telecom number that is coded according to predetermined coding rule(s), or may be a character string having a predetermined format. By initiating a call request, a communication device expects to establish communications with a communication device that uses a called number.

In implementations, a basic communication server may receive a call request for a communication number, and may make a call directed to the communication number. The intermediate communication number may be a portion of content of the call request, or may be an attachment of the call request. The basic communication server may determine that the communication number which the received call request is directed to is an intermediate communication number based on predetermined rule(s). The predetermined rule(s) may include: querying intermediate communication number(s) in a stored intermediate communication number set, and recognizing the communication number to which the call request is directed as an intermediate communication number if a communication number that is the same as the communication number which the call request is directed to is found. An intermediate communication number may be a number in a predetermined number segment. If the communication number to which the call request is directed is found within that predetermined number segment, the communication number to which the call request is directed can be recognized as an intermediate communication number. For example, a number between "95000000000-95011111111" is an intermediate communication number.

In implementations, the current calling number may be a communication number used by a communication device that initiates a call request.

In implementations, the call request may include a current calling number. The current calling number may be a portion of content of the call request. Alternatively, the current calling number may be an attachment of the call request. The call request may have a predetermined format, and may also have predetermined content. For example, a call request may be "call request & 95000000000 & 17095051234", where "95000000000" may be an intermediate communication number, and "17095051234" may be a current calling number.

S504 sends a query request to a number management server, the query request including at least one of the current calling number or the intermediate communication number.

In implementations, after the basic communication server receives the call request for the intermediate communication number, the number management server needs to return a communication number that is to be used as a called number. Binding relationships may be stored in the number management server, and each binding relationship may possess three communication numbers, with one being an intermediate communication number and remaining ones being communication numbers used by user communication devices.

In implementations, the query request includes at least one of the current calling number or the intermediate communication number to be provided to the number management server, to enable the number management server to find corresponding binding information according to the communication number included in the query request, and thereby to return a communication number. An approach of including a communication number in a query request may include setting a current calling number or an intermediate communication number as a portion of content of the query request, or setting the current calling number or the intermediate communication number as an attachment of the query request. Alternatively, the current calling number and the intermediate communication number may be set as content of the query request. Alternatively, the current calling number and the intermediate communication number may be set as an attachment of the query request.

S506 receives number information returned by the number management server, the number information including a predetermined called number.

In implementations, the number management server returns number information to the basic communication server in response to the query request. The number information may include a communication number only, and that communication number is a predetermined called number. The number information may further include two communication numbers that are bound to the intermediate communication number in the target binding formation found by the number management server. One of these two communication numbers is the same as the current calling number, and the other one may be the predetermined called number. Under some circumstances, if these two communication numbers are not the same as the current calling number, a determination may be made that the current calling number is not bound to the intermediate communication number. In this case, a call failure may be returned to a communication device that uses the current calling number.

S508 converts the call request into a call to a communication device that uses the predetermined called number, a calling number provided to the communication device being the intermediate communication number.

In implementations, the basic communication server converts a call request for the intermediate communication number to a call to the predetermined called number. After the call is connected, a communication is established between a communication device that uses the current calling number and a communication device that uses the predetermined called number. Therefore, in a process of establishing communications, both communication parties do not need to know a communication number of the other party, and using a predetermined called number that is specified by the number management server effectively avoids a leakage of communication numbers of the communication parties.

In implementations, a calling number provided to the communication device that uses the predetermined called number is the intermediate communication number, which effectively avoids a leakage of a communication number that initiates a call. Moreover, as a binding relationship between the intermediate communication number and the predetermined called number exists at the same time, a user will know transaction information corresponding to the intermediate communication number upon receiving the call.

In implementations, during online shopping, a buyer may apply for an intermediate communication number during a transaction for example. A communication number of the buyer may therefore be bound to an intermediate communication number. Furthermore, a communication number of a seller may also be bound to the intermediate communication number, and the number management server stores binding information of these three communication numbers.

When the buyer makes a call to the intermediate communication number, the basic communication server sends a query request to the number management server after receiving a call request directed to the intermediate communication number from the buyer. The number management server queries stored binding information based on a current calling number included in the query request to obtain a communication number which is the communication number of the seller from the binding information and is different from the current calling number, and returns the communication number of the seller to the basic communication server as a predetermined called number. As such, the basic communication server can initiate a call to the predetermined called number, thereby setting up a communication connection between the buyer and the seller, without the need of knowing the communication number of the seller by the buyer. Similarly, the seller does not need to know the communication number of the buyer. Likewise, the foregoing description is also applicable to a situation in which the seller makes a call to the buyer.

In implementations, S502 may further include determining whether a current called number to which the call request is directed is an intermediate communication number. In implementations, after receiving the call request, the basic communication server may determine whether a communication number to which the call request is directed is an intermediate communication number. An exemplary method of determining whether a current called number is an intermediate communication number may include querying whether the current called number exists in a temporary communication number set that is stored, and recognizing the current called number as the intermediate communication number if the current called number exists in the temporary communication number set. When the current called number does not exist in the temporary communication number set, a call is directly initiated to the current called number. In this way, a determination of whether the communication number to which the call request is directed is an intermediate communication number avoids sending a query request to the number management server when the communication number to which the call request is directed is not an intermediate communication number, thereby improving the entire processing efficiency of an associated transaction.

In implementations, the communication method may further include making a call directly to the current called number in an event that the current called number to which the call request is directed is not an intermediate communication number.

In implementations, when the basic communication server finds that the current called number to which the call request is directed is not an intermediate communication number, the current called number which the call request is directed does not need to be converted into another communication number, and thus a call is made directly to the current called number.

Figure 6:
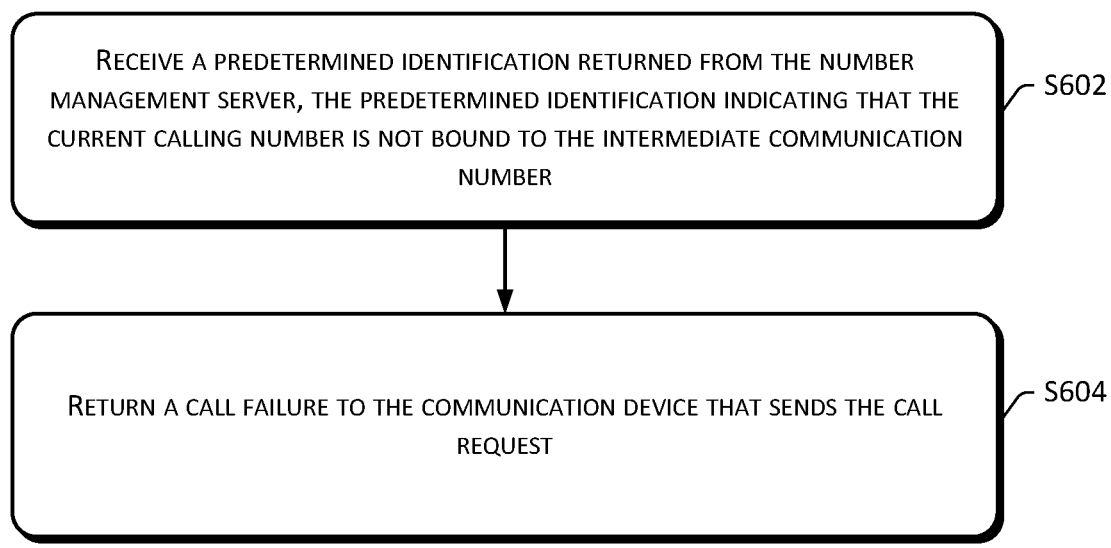
FIG. 6 is a flowchart of a communication method according to an embodiment of the present disclosure.

In implementations, the communication method may further include the following method blocks as shown in FIG. 6.

S602 receives a predetermined identification returned from the number management server, the predetermined identification indicating that the current calling number is not bound to the intermediate communication number.

S604 returns a call failure to the communication device that sends the call request.

In implementations, after the basic communication server sends a query request to the number management server, the number management server does not find the communication number included in the query request from the stored binding relationship in response to the query request, and in this case, may send a predetermined identification to the basic communication server, to indicate that the communication number included in the query request is not bound, that is, the current calling number is not bound to the intermediate communication number. In this way, when the communication number to which the call request is directed is not bound to the intermediate communication number, a call failure is returned to the communication device that uses the communication number. Therefore, when a communication device, which uses another communication number other than communication number(s) that has/have been bound to the intermediate communication number, sends a call request to the intermediate communication number, a call failure is returned, which effectively avoids causing trouble to a user of a communication number that is bound to the intermediate number after a leakage of the intermediate communication number.

Figure 7:
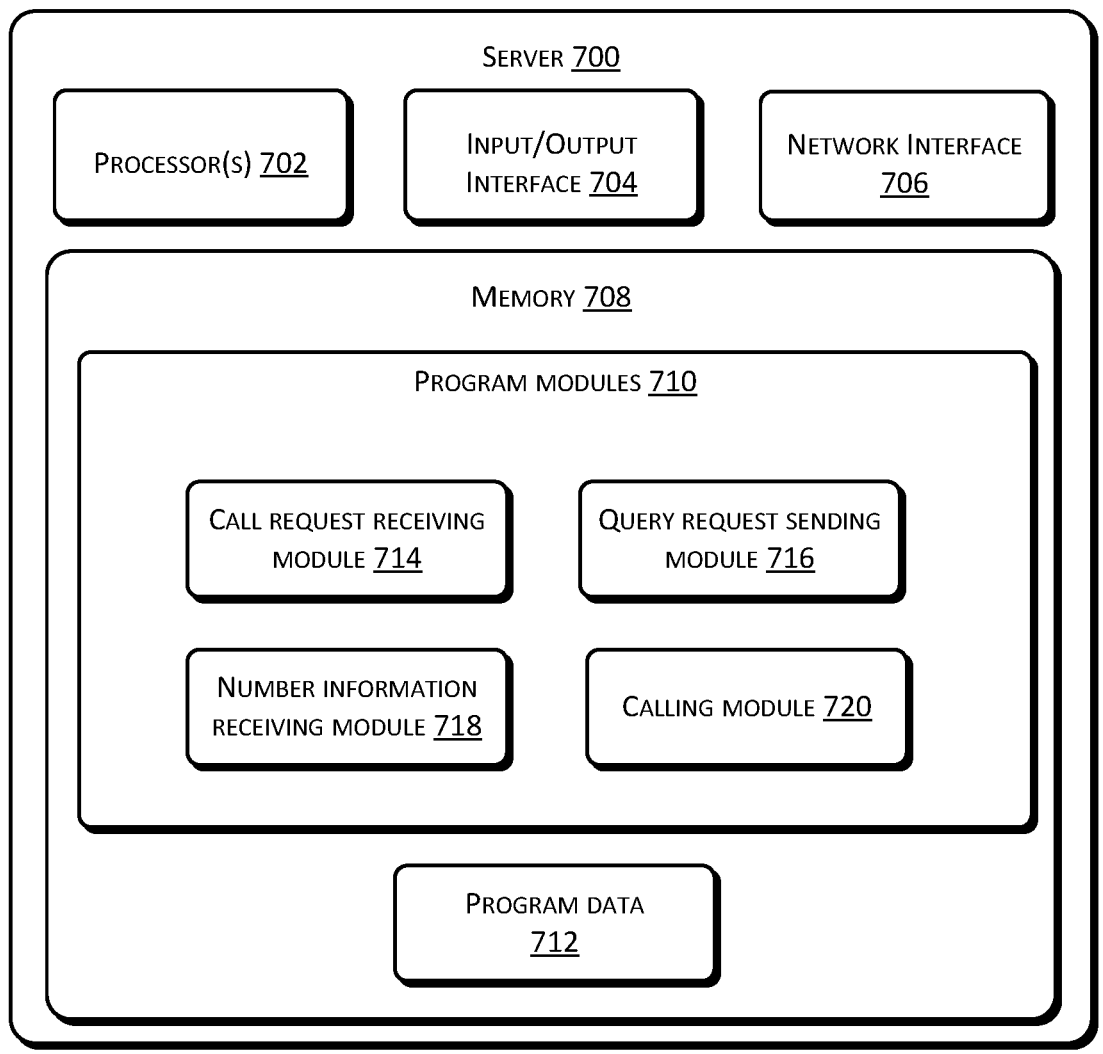
FIG. 7 is a module diagram of a server according to an embodiment of the present disclosure.

Referring to FIG. 7, the present disclosure further provides a server 700. In implementations, the server 700 may include one or more processors 702, an input/output (I/O) interface 704, a network interface 706 and memory 708.

The memory 708 may include a form of computer-readable media, e.g., a non-permanent storage device, random-access memory (RAM) and/or a nonvolatile internal storage, such as read-only memory (ROM) or flash RAM. The memory 708 is an example of computer-readable media as described in the foregoing description.

The memory 708 may include program modules 710 and program data 712. In implementations, the program modules 710 may include a call request receiving module 714, a query request sending module 716, a number information receiving module 718 and a calling module 720.

The call request receiving module 714 receives a call request for an intermediate communication number, the call request including a current calling number.

In implementations, a call request may be a predetermined telecom number that is coded according to predetermined coding rule(s), or may be a character string having a predetermined format. By initiating a call request, a communication device expects to establish communications with a communication device that uses a called number.

In implementations, the call request receiving module 714 may receive a call request for a communication number, and may make a call directed to the communication number. The intermediate communication number may be a portion of content of the call request, or may be an attachment of the call request. The server 700 may determine that the communication number which the received call request is directed to is an intermediate communication number based on predetermined rule(s). The predetermined rule(s) may include: querying intermediate communication number(s) in a stored intermediate communication number set, and recognizing the communication number to which the call request is directed as an intermediate communication number if a communication number that is the same as the communication number which the call request is directed to is found. An intermediate communication number may be a number in a predetermined number segment. If the communication number to which the call request is directed is found within that predetermined number segment, the communication number to which the call request is directed can be recognized as an intermediate communication number. For example, a number between "95000000000-95011111111" is an intermediate communication number.

In implementations, the current calling number may be a communication number used by a communication device that initiates a call request.

In implementations, the call request may include a current calling number. The current calling number may be a portion of content of the call request. Alternatively, the current calling number may be an attachment of the call request. The call request may have a predetermined format, and may also have predetermined content. For example, a call request may be "call request & 95000000000 & 17095051234", where "95000000000" may be an intermediate communication number, and "17095051234" may be a current calling number.

The query request sending module 716 sends a query request to a number management server, the query request including at least one of the current calling number or the intermediate communication number.

In implementations, after the call request receiving module 714 receives the call request for the intermediate communication number, the number management server needs to return a communication number that is to be used as a called number. Binding relationships may be stored in the number management server, and each binding relationship may have three communication numbers, with one being an intermediate communication number, and remaining ones being communication numbers used by user communication devices.

In implementations, the query request includes at least one of the current calling number or the intermediate communication number to be provided to the number management server, to enable the number management server to find corresponding binding information according to the communication number included in the query request, and thereby to return a communication number. An approach of including a communication number in a query request may include setting a current calling number or an intermediate communication number as a portion of content of the query request, or setting the current calling number or the intermediate communication number as an attachment of the query request. Alternatively, the current calling number and the intermediate communication number may be set as content of the query request. Alternatively, the current calling number and the intermediate communication number may be set as an attachment of the query request.

The number information receiving module 718 receives number information returned by the number management server, the number information including a predetermined called number.

In implementations, the number management server returns number information to the server 700 in response to the query request. The number information may include a communication number only, and that communication number is a predetermined called number. The number information may further include two communication numbers that are bound to the intermediate communication number in the target binding formation found by the number management server. One of these two communication numbers is the same as the current calling number, and the other one may be the predetermined called number.

The calling module 720 converts the call request into a call to a communication device that uses the predetermined called number, a current calling number provided to the communication device being the intermediate communication number.

In implementations, the server 700 converts a call request for the intermediate communication number to a call directed to the predetermined called number. After the call is connected, a communication is established between a communication device that uses the current calling number and a communication device that uses the predetermined called number. Therefore, in a process of establishing communications, both communication parties do not need to know a communication number of the other party, and using a predetermined called number that is specified by the number management server effectively avoids a leakage of communication numbers of the communication parties.

In implementations, a calling number provided to the communication device that uses the predetermined called number is the intermediate communication number, which effectively avoids a leakage of a communication number that initiates a call. Moreover, as a binding relationship between the intermediate communication number and the predetermined called number exists at the same time, a user will know transaction information corresponding to the intermediate communication number upon receiving the call.

In implementations, during online shopping, a buyer may apply for an intermediate communication number during a transaction for example. A communication number of the buyer may therefore be bound to an intermediate communication number. Furthermore, a communication number of a seller may also be bound to the intermediate communication number, and the number management server stores binding information of these three communication numbers. When the buyer makes a call to the intermediate communication number, the basic communication server sends a query request to the number management server after receiving a call request directed to the intermediate communication number from the buyer. The number management server queries stored binding information based on a current calling number included in the query request to obtain a communication number which is the communication number of the seller from the binding information and is different from the current calling number, and returns the communication number of the seller to the basic communication server as a predetermined called number. As such, the basic communication server can initiate a call to the predetermined called number, thereby setting up a communication connection between the buyer and the seller, without the need of knowing the communication number of the seller by the buyer. Similarly, the seller does not need to know the communication number of the buyer. Likewise, the foregoing description is also applicable to a situation in which the seller makes a call to the buyer.

Figure 8:
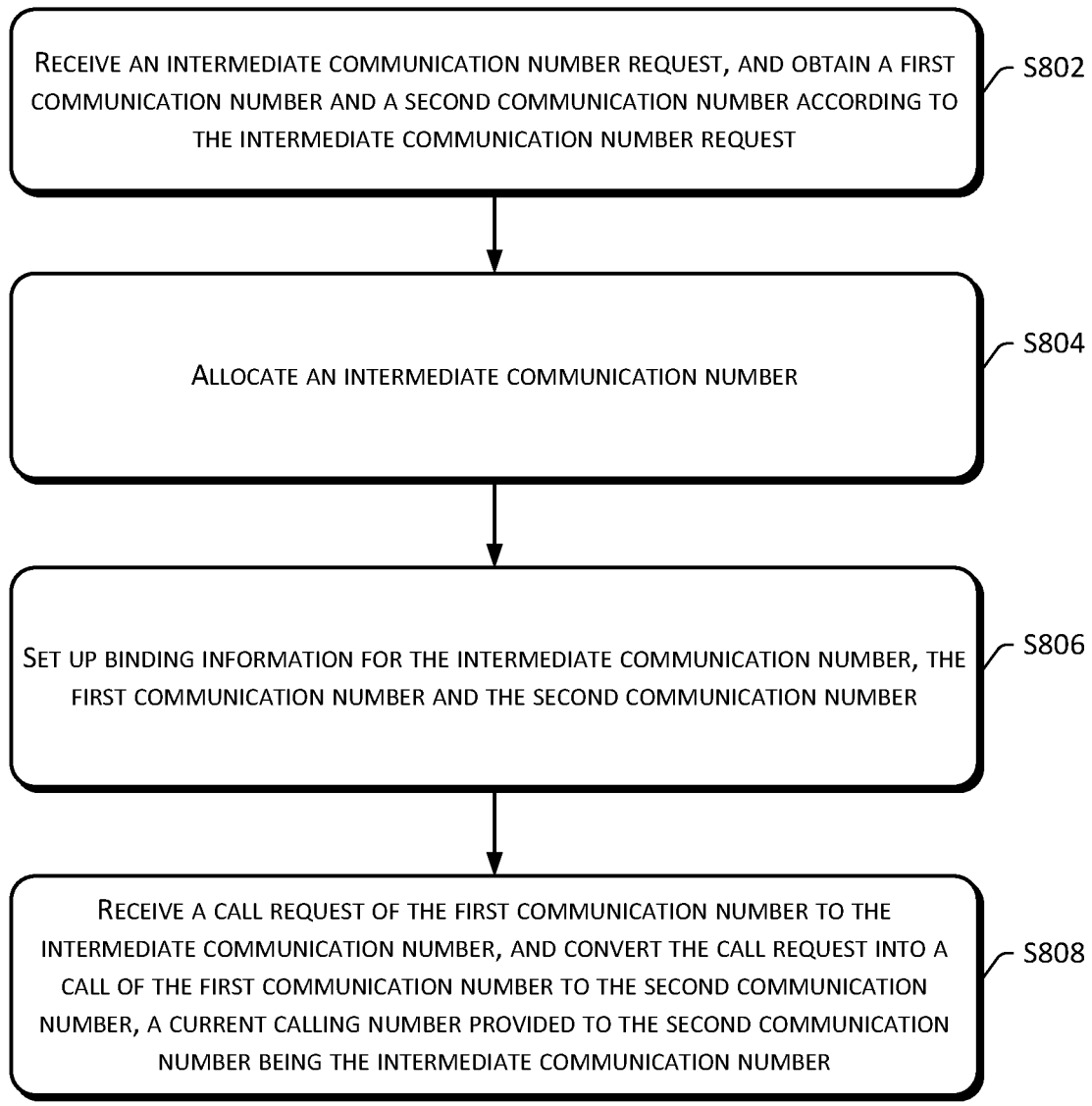
FIG. 8 is a flowchart of a communication method according to an embodiment of the present disclosure.

Referring to FIG. 8, an embodiment of the present disclosure further provides a communication method, which may include the following method blocks.

S802 receives an intermediate communication number request, and obtains a first communication number and a second communication number according to the intermediate communication number request.

In implementations, the server receives an intermediate communication number request sent by a communication device. The communication device may include a desktop computer, a notebook computer, a tablet computer, a smartphone, a server or a smart wearable device.

In implementations, a receipt of an intermediate communication number request may represent a request for allocating an intermediate communication number for a first communication number and a second communication number. A such, during a process of conducting communications between a communication device that uses the first communication number and a communication device that uses the second communication number, both parties can establish the communications merely through the intermediate communication number without the need of knowing a real communication number of the other party. In other words, the device that uses the first communication number does not need to know the second communication number, and the device that uses the second communication number does not need to know the first communication number, thereby effectively protecting the privacy of both communication parties.

In implementations, the intermediate communication number request may be a character string having a representation of a predetermined meaning. A receipt of the character string indicates a request for allocating the intermediate communication number. Apparently, the number management server may have a predetermined port that is set up to receive the intermediate communication number request. In this case, the intermediate communication number request may not have a predetermined form, and a receipt of data at the predetermined port indicates that the intermediate communication number request is received.

In implementations, an approach of obtaining a first communication number and a second communication number according to the intermediate communication number request may include as follows. The intermediate communication number request includes the first communication number and the second communication number, where the first communication number and the second communication number may be a portion of the intermediate communication number request or an attachment of the intermediate communication number request. The intermediate communication number request includes respective identity information corresponding to the first communication number and the second communication number, and the corresponding first communication number and the corresponding second communication number are searched for from a database that is locally stored based on the respective identity information. The first communication number and the second communication number may be obtained at different time points. For example, when the intermediate communication number request includes the first communication number, the communication device that uses the second communication number may provide the second communication number to the number management server or provide identity information to the number management server due to a need in a transaction process, so that the number management server can obtain the second communication number from stored data based on the identity information.

In implementations, the first communication number and the second communication number may be respective phone numbers usually used by different users. The first communication number and the second communication number may be numbers of fixed-line telephones, or may be numbers of mobile phones, which are not limited to any number segment.

S804 allocates an intermediate communication number.

In implementations, the number management server may store an intermediate communication number set locally, and select an intermediate communication number from the intermediate communication number set according to predetermined rule(s). The number management server may also be provided with a predetermined algorithm, and obtain an intermediate communication number according to the predetermined algorithm. The intermediate communication number may also be a number of a segment. For example, a number between "95000000000-95011111111" may be used as the intermediate communication number.

In implementations, S802 and S804 are not limited to be executed in a sequential order, and may also be performed in an overlapping manner. For example, when the intermediate communication number request includes a first communication number, an intermediate communication number is allocated, and a second communication number may not have been obtained at this point yet.

S806 sets up binding information for the intermediate communication number, the first communication number and the second communication number.

In implementations, the binding information is used for indicating an association relationship among the first communication number, the second communication number and the intermediate communication number. Furthermore, any one or more of the first communication number, the second communication number and the intermediate communication number can be obtained based on the binding information. Moreover, the binding information can be found based on any one or more of the first communication number, the second communication number and the intermediate communication number.

In implementations, an exemplary form of the binding information may include, for example, storing first communication numbers, second communication numbers and intermediate communication numbers associatively with one another in a form of a data table. The first communication numbers are stored in one column of the data table, the second communication numbers are stored in another column, and the intermediate communication numbers are stored in a third column. A first communication number, a second communication number and an intermediate communication number that are correlated are located in a same row, that is, a row in the data table may be a piece of binding information. Alternatively, respective identity information correspond to the first communication number and the second communication number are correspondingly stored together with the intermediate communication number, so that the first communication number and the second communication number can be obtained based on the respective identity information.

S808 receives a call request of the first communication number to the intermediate communication number, and converts the call request into a call of the first communication number to the second communication number, a current calling number provided to the second communication number being the intermediate communication number.

In implementations, the call request may be a predetermined telecom number coded according to a predetermined coding rule, or may be a character string having a predetermined format. A communication device, by initiating a call request, expects to establish communication with a communication device that uses a called number.

In implementations, a call request may be a predetermined telecom number that is coded according to predetermined coding rule(s), or may be a character string having a predetermined format. By initiating a call request, a communication device expects to establish communications with a communication device that uses a called number.

In implementations, the server converts a call request for the intermediate communication number to a call directed to the second communication number. After the call is connected, a communication is established between a communication device that uses the first communication number and a communication device that uses the second communication number. So, during a process of establishing communication, both communication parties do not need to know a communication number of the other party, and a correlation is set up between two numbers through the server, which effectively avoids a leakage of the communication numbers of the communication parties.

In implementations, a calling number provided to the communication device that uses the second communication number is the intermediate communication number, thus effectively avoiding a leakage of the first communication number that initiates a call. Moreover, as a binding relationship between the intermediate communication number and the second communication number also exists, a user is able to know transaction information corresponding to the intermediate communication number upon receiving the call.

In implementations, the communication method may further include receiving a call request of the second communication number to the intermediate communication number, and converting the call request into a call of the second communication number to the first communication number, a current calling number provided to the first communication number being the intermediate communication number.

In implementations, a relay number for communications is set up between a first communication number and a second communication number by setting an intermediate communication number. In other words, when the first communication number calls the intermediate communication number, a communication is established between the first communication number and the second communication number. When the second communication number calls the intermediate communication number, a communication is established between the second communication number and the first communication number. Therefore, a user using the first communication number and a user using the second communication number are able to establish communications with each other through the intermediate communication number without knowing a communication number of the other party, thus effectively avoiding a leakage of the communication numbers of the users.

In implementations, the communication method may further include receiving a call request of a third communication number to the intermediate communication number, and returning call failure information to the third communication number.

In implementations, after receiving a call request, the server finds that a called number to which the call request is directed is an intermediate communication number. However, a third communication number that initiates the call request is not bound to the intermediate communication number. In this case, call failure information is returned to the third communication number. In this way, under certain situations in which the intermediate communication number is leaked, even if other users know the intermediate communication number, it is impossible to cause trouble to the user that uses the first communication number or the second communication number by calling the intermediate communication number.

Figure 9:
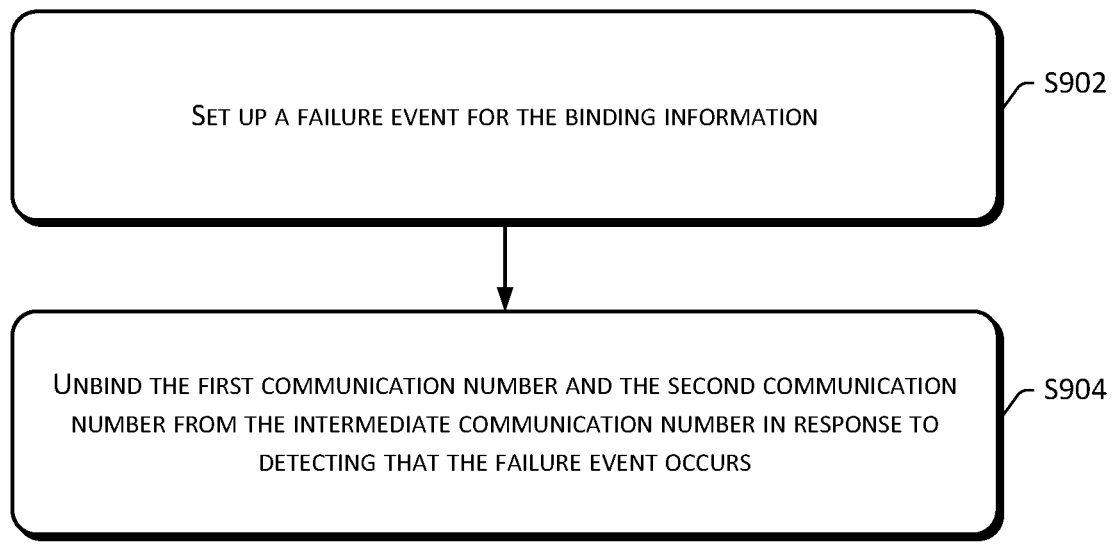
FIG. 9 is a flowchart of a communication method according to an embodiment of the present disclosure.

In implementations, the communication method may further include the following method blocks as shown in FIG. 9.

S902 sets up a failure event for the binding information.

S904 unbinds the first communication number and the second communication number from the intermediate communication number in response to detecting that the failure event occurs.

In implementations, when the first communication number and the second communication number are released from binding with the intermediate communication number, the number management server cancels corresponding stored binding information.

In implementations, by setting up a failure event for binding information of a first communication number, a second communication number and an intermediate communication number, a binding of these three entities is released when the failure event occurs. Therefore, a user that uses the first communication number and a user that uses the second communication number are unable to contact with each other again through the intermediate communication number after an associated transaction process is ended, thus effectively preventing the user that uses the first communication number or the second communication number from harassing the other by calling the intermediate communication number again, after the transaction process is ended.

In implementations, an expiration time for the binding information may be set. In other words, a failure event may include a current time length of the binding information exceeding the expiration time, as counted from the time when the binding information is set up. The failure event may further include receiving an unbinding request, and the unbinding request may be sent by a user communication device or a business server that is used for processing transaction logics. Apparently, the failure event may further include other events. One skilled in the art may make other modifications under the teaching of the technical essences of the present disclosure, which shall be covered within the scope of protection of the present disclosure as long as functions and effects thereof are the same as or similar to those of the present disclosure.

In implementations, the failure event includes a current time being greater than an effective time that is set. In implementations, an effective time may be set for the binding information. The effective time may be a specific time, and when the current time is greater than the specific time, this indicates that the current time goes past the set effective time. For example, an effective time is 24:00 on Mar. 10, 2015. After the current time goes past that time, the binding information will automatically become ineffective. Alternatively, the effective time may be a time length, and the time length may be counted from the time when the binding information is set up, or may be counted from the time when the number management server receives the intermediate communication number request. When a difference between the current time and the time when the counting begins is greater than a set time length, this indicates that the current time goes past the set effective time. For example, the time length may be 10 days, and the time when the binding information is set up is 12:00 on Feb. 11, 2015. When a difference between the current time and the time when the binding information is set up is greater than 10 days, the binding information is ineffective.

In implementations, the failure event includes receiving an unbinding request, and one or more of the first communication number, the second communication number and the intermediate communication number can be obtained according to the unbinding request.

In implementations, the unbinding request may be a character string having a representation of a predetermined meaning, and may also have a predetermined format. A user communication device may send out the unbinding request. Additionally or alternatively, a business server that processes transaction logics may send out the unbinding request.

In implementations, the unbinding request may include at least one of the first communication number, the second communication number or the intermediate communication number. A way of inclusion may include at least one of the first communication number, the second communication number or the intermediate communication number being a portion of content of the unbinding request, or at least one of the first communication number, the second communication number or the intermediate communication number being an attachment associated with the unbinding request. The unbinding request may further include identity information corresponding to at least one of the first communication number or the second communication number, the identity information may be information of a user that uses a communication number. The communication number corresponding thereto can be obtained from stored data using the identity information. Based on one of the first communication number, the second communication number and the intermediate communication number, binding information corresponding to these three entities can be obtained from stored binding information, so that a binding among them can be released by deleting the binding information.

Figure 10:
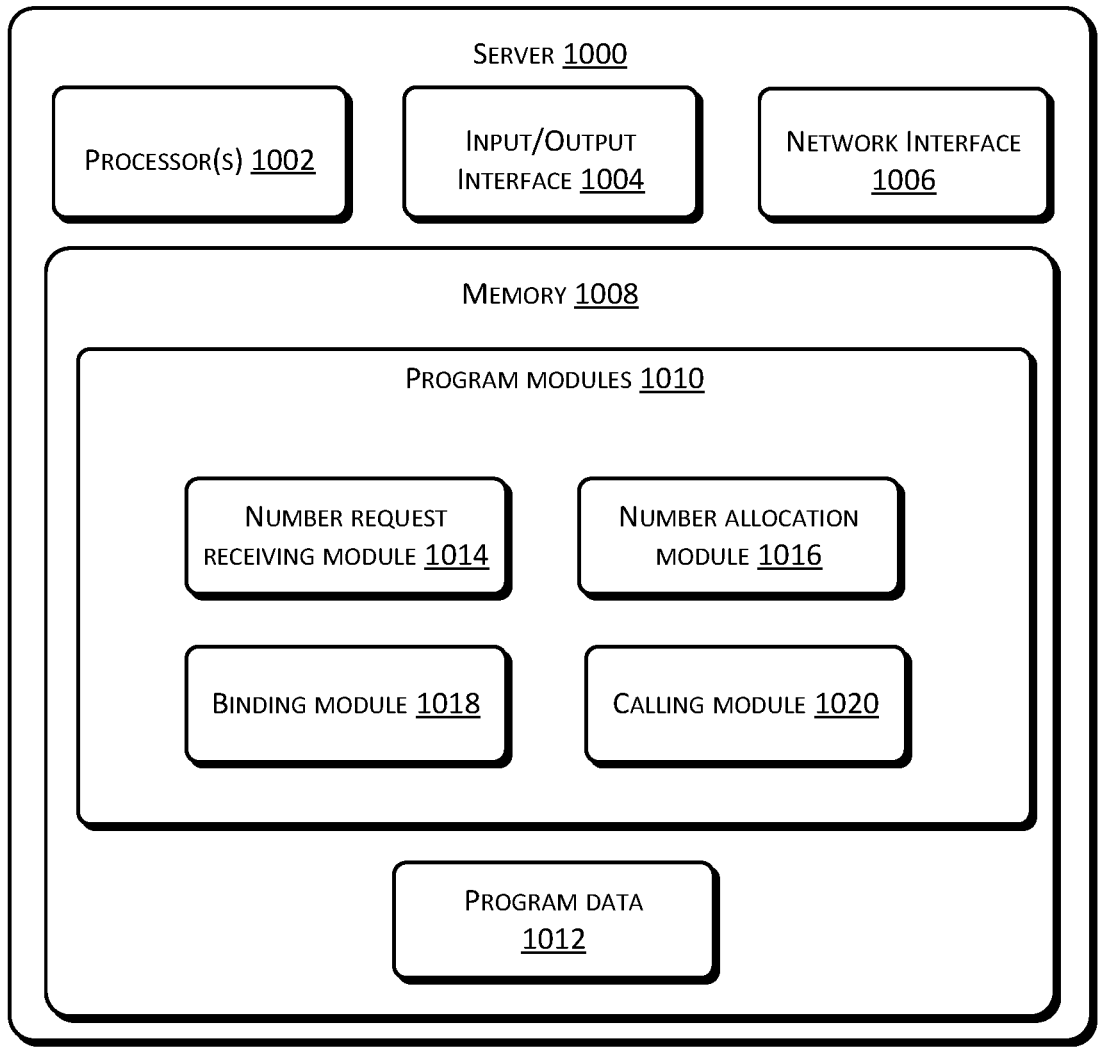
FIG. 10 is a modular diagram of a server according to an embodiment of the present disclosure.

Referring to FIG. 10, an embodiment of the present disclosure further provides a server 1000. In implementations, the server 1000 may include one or more computing devices. In implementations, the server 1000 may include one or more processors 1002, an input/output (I/O) interface 1004, a network interface 1006 and memory 1008.

The memory 1008 may include a form of computer-readable media, e.g., a non-permanent storage device, random-access memory (RAM) and/or a nonvolatile internal storage, such as read-only memory (ROM) or flash RAM. The memory 1008 is an example of computer-readable media as described in the foregoing description.

The memory 1008 may include program modules 1010 and program data 1012. In implementations, the program modules 1010 may include a number request receiving module 1014, a number allocation module 1016, a binding module 1018 and a calling module 1020.

The number request receiving module 1014 receives an intermediate communication number request, and obtains a first communication number and a second communication number according to the intermediate communication number request.

In implementations, the number request receiving module 1014 may receive an intermediate communication number request sent by a communication device. The number request receiving module 1014 may be a communication terminal that is able to connected to a network and receive information, or may be software that instructs a communication terminal to operate. The communication device may include a desktop computer, a notebook computer, a tablet computer, a smartphone, a server or a smart wearable device.

In implementations, the number request receiving module 1014 receives an intermediate communication number request, which may indicate a request of allocating an intermediate communication number for a first communication number and a second communication number. As such, during a process that a communication device that uses the first communication number and a communication device that uses the second communication number conduct communications, both parties may establish communication merely through the intermediate communication number without knowing a real communication number of the other party. In other words, the device that uses the first communication number does not need to know the second communication number, and the device that uses the second communication number does not need to know the first communication number, thereby effectively protecting the privacy of both communication parties.

In implementations, the intermediate communication number request may be a character string having a representation of a predetermined meaning. A receipt of the character string indicates a request for allocating the intermediate communication number. Apparently, the server 1000 may have a predetermined port that is set up to receive the intermediate communication number request. In this case, the intermediate communication number request may not have a predetermined form, and a receipt of data at the predetermined port indicates that the intermediate communication number request is received.

In implementations, an approach of obtaining a first communication number and a second communication number according to the intermediate communication number request may include as follows. The intermediate communication number request includes the first communication number and the second communication number, where the first communication number and the second communication number may be a portion of the intermediate communication number request or an attachment of the intermediate communication number request. The intermediate communication number request includes respective identity information corresponding to the first communication number and the second communication number, and the corresponding first communication number and the corresponding second communication number are searched for from a database that is locally stored based on the respective identity information. The first communication number and the second communication number may be obtained at different time points. For example, when the intermediate communication number request includes the first communication number, the communication device that uses the second communication number provides the second communication number to the number management server or provides identity information to the number management server due to a need in a transaction process, so that the number management server can obtain the second communication number from stored data based on the identity information.

In implementations, the first communication number and the second communication number may be respective phone numbers usually used by different users. The first communication number and the second communication number may be numbers of fixed-line telephones, or may be numbers of mobile phones, which are not limited to any number segment.

The number allocation module 1016 allocates an intermediate communication number.

In implementations, the server 1000 may store an intermediate communication number set locally, and the number allocation module 1016 may select an intermediate communication number from the intermediate communication number set according to predetermined rule(s). The number allocation module 1016 may further include a predetermined algorithm, and obtain an intermediate communication number according to the predetermined algorithm. Furthermore, the intermediate communication number may be a number of a segment. For example, a number between "95000000000-95011111111" may be used as the intermediate communication number.

The binding module 1018 sets up binding information for the intermediate communication number, the first communication number and the second communication number.

In implementations, the binding information is used for indicating an association relationship among the first communication number, the second communication number and the intermediate communication number. Furthermore, any one or more of the first communication number, the second communication number and the intermediate communication number can be obtained based on the binding information. Moreover, the binding information can be found based on any one or more of the first communication number, the second communication number and the intermediate communication number.

In implementations, an exemplary form of the binding information may include, for example, storing first communication numbers, second communication numbers and intermediate communication numbers associatively with one another in a form of a data table. The first communication numbers are stored in one column of the data table, the second communication numbers are stored in another column, and the intermediate communication numbers are stored in a third column. A first communication number, a second communication number and an intermediate communication number that are correlated are located in a same row, that is, a row in the data table may be a piece of binding information. Alternatively, respective identity information correspond to the first communication number and the second communication number are correspondingly stored together with the intermediate communication number, so that the first communication number and the second communication number can be obtained based on the respective identity information.

The call number module 1020 receives a call request of the first communication number to the intermediate communication number, and converts the call request into a call of the first communication number to the second communication number, a current calling number provided to the second communication number being the intermediate communication number.

In implementations, the call request may be a predetermined telecom number coded according to a predetermined coding rule, or may be a character string having a predetermined format. A communication device, by initiating a call request, expects to establish communication with a communication device that uses a called number.

In implementations, after receiving the call request, the server 1000 may determine whether a number to which the query request is directed is an intermediate communication number based on stored binding information, and whether the current calling number initiating the call request is the first communication number that is bound to the intermediate communication number.

In implementations, the server 1000 converts a call request for the intermediate communication number into a call directed to the second communication number. After the call is connected, a communication is established between a communication device that uses the first communication number and a communication device that uses the second communication number. So, in a process of establishing communications, both communication parties do not need to know a communication number of the other party, and a correlation is set up between two numbers through the server 1000, which effectively avoids a leakage of the communication numbers of both the communication parties.

In implementations, a calling number provided to the communication device that uses the second communication number is the intermediate communication number, thus effectively avoiding a leakage of the first communication number that initiates a call. Moreover, as a binding between the intermediate communication number and the second communication number also exists, a user is able to know transaction information corresponding to the intermediate communication number upon receiving the call.

Figure 11:
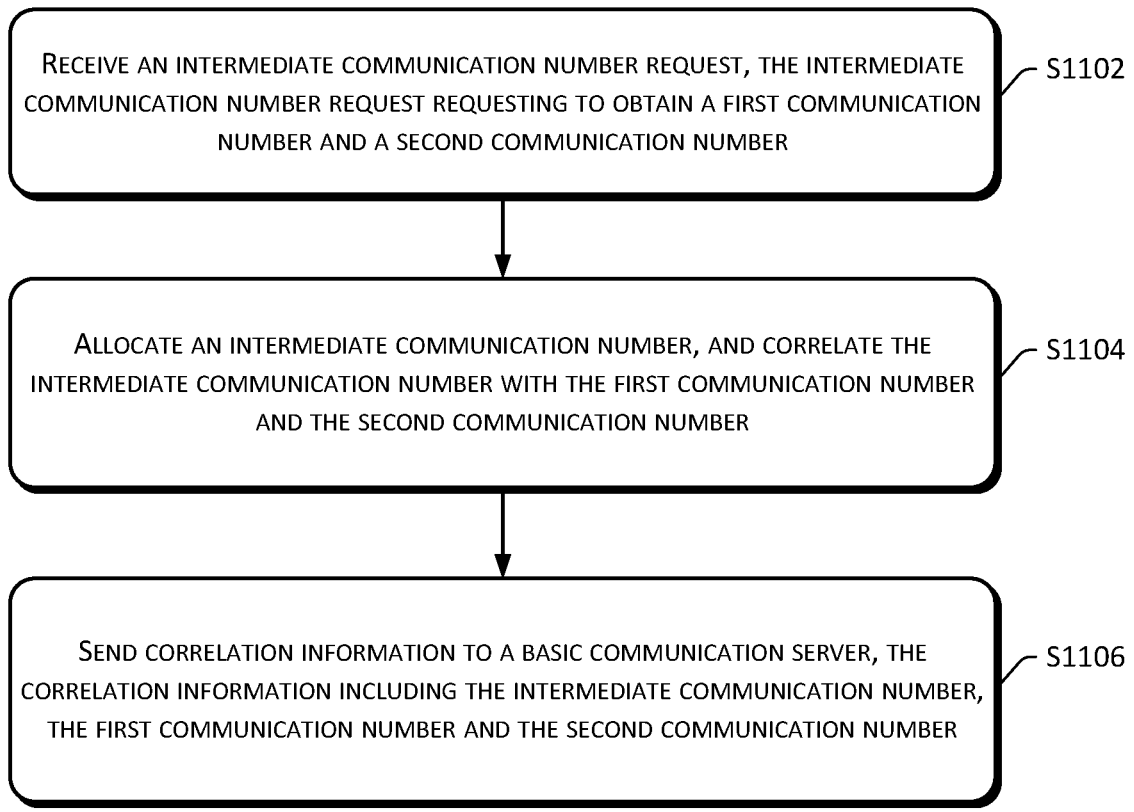
FIG. 11 is a flowchart of a communication method according to an embodiment of the present disclosure.

Referring to FIG. 11, an embodiment of the present disclosure further provides a communication method, which may include the following method blocks.

S1102 receives an intermediate communication number request, the intermediate communication number request requesting to obtain a first communication number and a second communication number.

In implementations, a number management server receives an intermediate communication number request sent by a communication device. The communication device may include a desktop computer, a notebook computer, a tablet computer, a smartphone, a server or a smart wearable device.

In implementations, a receipt of an intermediate communication number request may represent a request for allocating an intermediate communication number for a first communication number and a second communication number. A such, during a process of conducting communications between a communication device that uses the first communication number and a communication device that uses the second communication number, both parties can establish the communications merely through the intermediate communication number without the need of knowing a real communication number of the other party. In other words, the device that uses the first communication number does not need to know the second communication number, and the device that uses the second communication number does not need to know the first communication number, thereby effectively protecting the privacy of both communication parties.

In implementations, the intermediate communication number request may be a character string having a representation of a predetermined meaning. A receipt of the character string indicates a request for allocating the intermediate communication number. Apparently, the number management server may have a predetermined port that is set up to receive the intermediate communication number request. In this case, the intermediate communication number request may not have a predetermined form, and a receipt of data at the predetermined port indicates that the intermediate communication number request is received.

In implementations, an approach of obtaining a first communication number and a second communication number according to the intermediate communication number request may include as follows. The intermediate communication number request includes the first communication number and the second communication number, where the first communication number and the second communication number may be a portion of the intermediate communication number request or an attachment to the intermediate communication number request. The intermediate communication number request includes respective identity information corresponding to the first communication number and the second communication number, and the corresponding first communication number and the corresponding second communication number are searched for from a database that is locally stored based on the respective identity information. The first communication number and the second communication number may be obtained at different time points. For example, when the intermediate communication number request includes the first communication number, the communication device that uses the second communication number provides the second communication number to the number management server or provides identity information to the number management server due to a need in a transaction process, so that the number management server can obtain the second communication number from stored data based on the identity information.

In implementations, the first communication number and the second communication number may be respective phone numbers usually used by different users. The first communication number and the second communication number may be numbers of fixed-line telephones, or may be numbers of mobile phones, which are not limited to any number segment.

S1104 allocates an intermediate communication number, and correlates the intermediate communication number with the first communication number and the second communication number.

In implementations, the number management server may locally store an intermediate communication number set, and select an intermediate communication number from the intermediate communication number set according to predetermined rule(s). The number management server may also be provided with a predetermined algorithm, and obtain an intermediate communication number according to the predetermined algorithm. Furthermore, the intermediate communication number may be a number of a segment. For example, a number between "95000000000-95011111111" may be used as the intermediate communication number.

In implementations, S1102 and S1104 are not limited to be executed in a sequential order, and may also be performed in an overlapping manner. For example, when the intermediate communication number request includes a first communication number, an intermediate communication number is allocated, and a second communication number may not have been obtained at this point yet.

In implementations, correlating the intermediate communication number with the first communication number and the second communication number may be implemented by storing the first communication number, the second communication number and the intermediate communication number correlatively with each other in a form of a data table. First communication numbers may be stored in one column of the data table, second communication numbers may be stored in another column, and intermediate communication numbers may be stored in a third column. A first communication number, a second communication number and an intermediate communication number that are correlated with one another are located in a same row. Alternatively, respective identity information correspond to the first communication number and the second communication number may be correspondingly stored together with the intermediate communication number, so that the first communication number and the second communication number can be obtained based on the respective identity information.

S1106 sends correlation information to a basic communication server, the correlation information including the intermediate communication number, the first communication number and the second communication number.

In implementations, the correlation information may be a character string having a predetermined format, which may be used for indicating a need for the basic communication server to bind communication numbers included in the correlation information.

In implementations, including the intermediate communication number, the first communication number and the second communication number in the correlation information may include a situation that the intermediate communication number, the first communication number and the second communication number are a portion of content of the correlation information, or a situation that the intermediate communication number, the first communication number and the second communication number are acted as an attachment of the correlation information.

Figure 12:
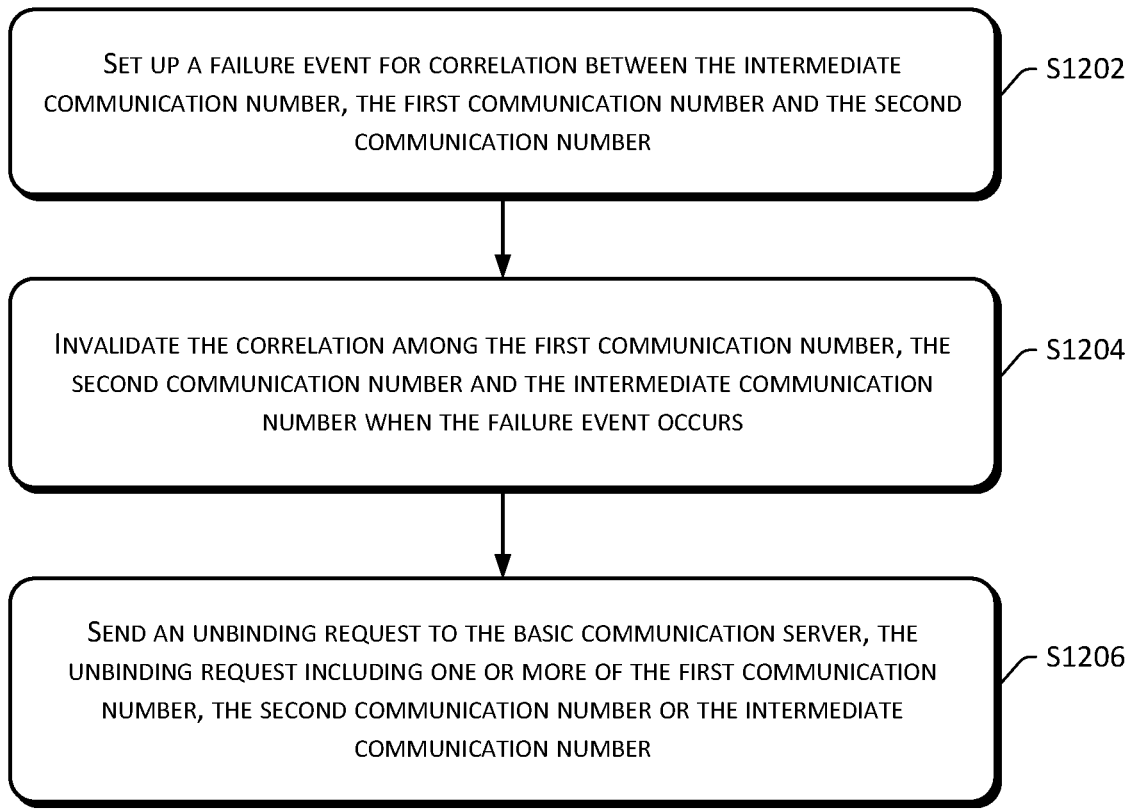
FIG. 12 is a flowchart of a communication method according to an embodiment of the present disclosure.

In implementations, the communication method may further include the following method blocks as shown in FIG. 12.

S1202 sets up a failure event for correlation between the intermediate communication number, the first communication number and the second communication number.

S1204 invalidates the correlation among the first communication number, the second communication number and the intermediate communication number when the failure event occurs.

S1206 sends an unbinding request to the basic communication server, the unbinding request including one or more of the first communication number, the second communication number or the intermediate communication number.

In implementations, by setting up a failure event for binding information of a first communication number, a second communication number and an intermediate communication number, a binding of these three entities is released when the failure event occurs. Therefore, a user that uses the first communication number and a user that uses the second communication number are unable to contact with each other again through the intermediate communication number after an associated transaction process is ended, thus effectively preventing the user that uses the first communication number or the second communication number from harassing the other by calling the intermediate communication number again, after the transaction process is ended.

In implementations, an expiration time may be set, i.e., counted from the time when these three numbers begin to be correlated. The failure event may include that a current time length of these three numbers being correlated exceeding the expiration time. The failure event may further include receiving an unbinding request, and the unbinding request may be sent by a user communication device or a business server that is used for processing transaction logics. Apparently, the failure event may further include other events. One skilled in the art may make other modifications under the teaching of the technical essences of the present disclosure, which shall be covered within the scope of protection of the present disclosure as long as functions and effects thereof are the same as or similar to those of the present disclosure.

In implementations, an unbinding request is sent to the basic communication server to cause the basic communication server to release a binding of the first communication number and the second communication number from the intermediate communication number, thereby allowing recycling of the intermediate communication number. Moreover, the basic communication server unbinds the three communication numbers, so that a party that uses the first communication number or the second communication number is unable to initiate a call to the other party again according to the intermediate communication number after an associated transaction process is ended, thus avoiding conducting harassment after the transaction process is ended.

In implementations, the unbinding request may be a character string having a predetermined format. The unbinding request includes one or more of the first communication number, the second communication number or the intermediate communication number. The communication number(s) may be included as a portion of content of the unbinding request, or included as an attachment of the unbinding request.

In implementations, the failure event includes a current time being greater than an effective time that is set. In implementations, an effective time may be set for a correlation among the three numbers. The effective time may be a particular time, and when the current time is greater than the particular time, this indicates that the current time goes past the set effective time. For example, an effective time is 24:00 on Mar. 10, 2015. After the current time goes past that time, the correlation among the three numbers automatically becomes ineffective. Alternatively, the effective time may be a time length, and the time length may be counted from the time when the correlation is established, or may be counted from the time when the number management server receives the intermediate communication number request. When a difference between the current time and the time when the counting begins is greater than a set time length, this indicates that the current time goes past the set effective time. For example, the time length may be 10 days, and the time when the binding information is set up is 12:00 on Feb. 11, 2015. When a difference between the current time and the time when the binding information is set up is greater than 10 days, the correlation is invalid.

In implementations, the failure event may include receiving a correlation invalidating request, and one or more of the first communication number, the second communication number or the intermediate communication number may be obtained according to the correlation invalidating request.

In implementations, the correlation invalidating request may be a character string having a representation of a predetermined meaning, and may also have a predetermined format. A user communication device may send out the correlation invalidating request. Additionally or alternatively, a business server that processes transaction logics may send out the correlation invalidating request.

In implementations, the correlation invalidating request may include at least one of the first communication number, the second communication number or the intermediate communication number. A way of inclusion may include at least one of the first communication number, the second communication number or the intermediate communication number being a portion of content of the correlation invalidating request, or at least one of the first communication number, the second communication number or the intermediate communication number being an attachment associated with the correlation invalidating request. The correlation invalidating request may further include identity information corresponding to at least one of the first communication number or the second communication number, and the identity information may be information of a user that uses a communication number. The basic communication server may obtain a corresponding communication number from stored data using the identity information. Based on one of the first communication number, the second communication number and the intermediate communication number, the basic communication server may obtain binding information corresponding to these three entities from stored binding information, so that a binding among these three entities can be released by deleting the binding information.

Figure 13:
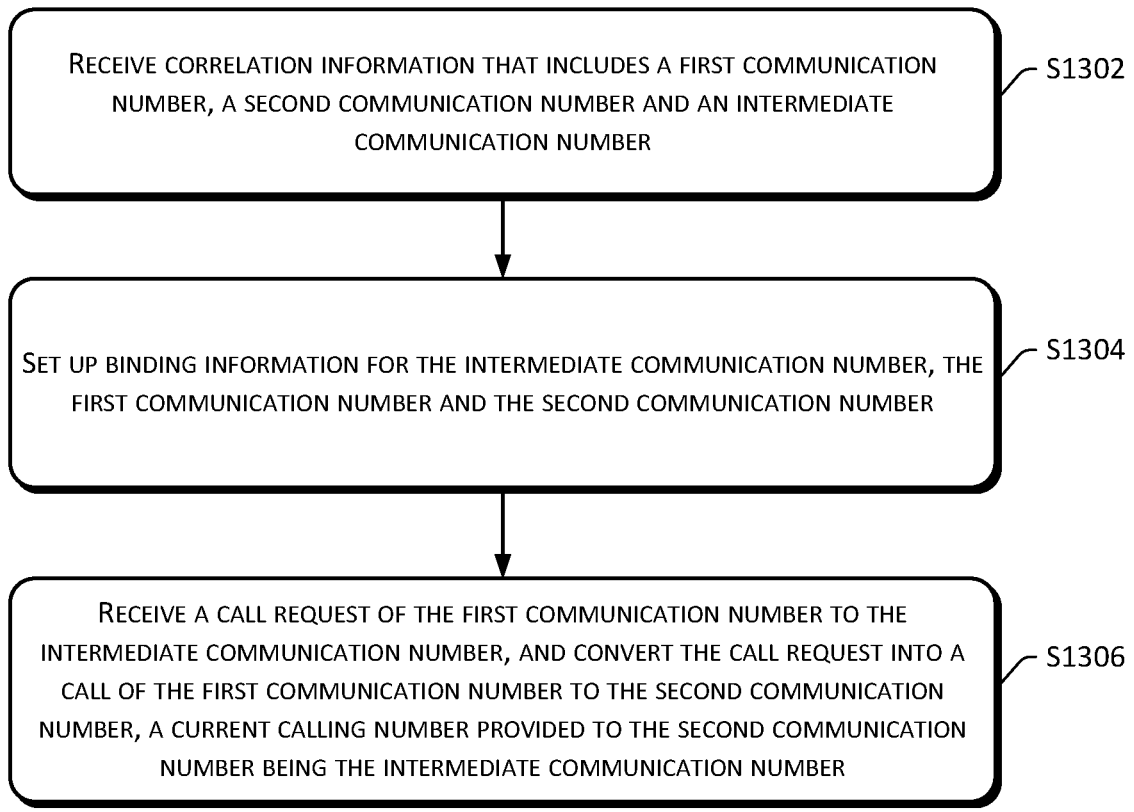
FIG. 13 is a flowchart of a communication method according to an embodiment of the present disclosure.

Referring to FIG. 13, an embodiment of the present disclosure further provides a communication method, which may include the following method blocks.

S1302 receives correlation information that includes a first communication number, a second communication number and an intermediate communication number.

In implementations, when the basic communication server receives correlation information, this indicates that a binding among the first communication number, the second communication number and the intermediate communication number that are included in the correlation information is needed to be performed.

In implementations, the basic communication server may be a server of a telecom operator, which is able to make a call specific to a communication number in response to a call request.

S1304 sets up binding information for the intermediate communication number, the first communication number and the second communication number.

In implementations, the binding information is used for indicating an association relationship among the first communication number, the second communication number and the intermediate communication number. Furthermore, any one or more of the first communication number, the second communication number or the intermediate communication number can be obtained based on the binding information. Moreover, the binding information can be found based on any one or more of the first communication number, the second communication number or the intermediate communication number.

In implementations, an exemplary form of the binding information may include, for example, storing first communication numbers, second communication numbers and intermediate communication numbers correlatively with one another in a form of a data table. The first communication numbers are stored in one column of the data table, the second communication numbers are stored in another column, and the intermediate communication numbers are stored in a third column. A first communication number, a second communication number and an intermediate communication number that are correlated are located in a same row, that is, a row in the data table may be a piece of binding information. Alternatively, respective identity information correspond to the first communication number and the second communication number is correspondingly stored together with the intermediate communication number, so that the first communication number and the second communication number can be obtained based on the respective identity information.

S1306 receives a call request of the first communication number to the intermediate communication number, and converts the call request into a call of the first communication number to the second communication number, a current calling number provided to the second communication number being the intermediate communication number.

In implementations, the call request may be a predetermined telecom number that is coded according to predetermined coding rule(s), or may be a character string having a predetermined format. By initiating a call request, a communication device expects to establish communications with a communication device that uses a called number.

In implementations, after receiving the call request, the basic communication server may determine whether a number to which the query request is directed is an intermediate communication number, and whether the current calling number that initiates the call request is the first communication number bound to the intermediate communication number based on stored binding information.

In implementations, the server converts a call request for the intermediate communication number to a call specific to the second communication number. After the call is connected, a communication is established between a communication device that uses the first communication number and a communication device that uses the second communication number. So, in a process of establishing communications, both communication parties do not need to know a communication number of the other party, and a correlation is set up between the two numbers through the server, which effectively avoids a leakage of the communication numbers of both the communication parties.

In implementations, a calling number provided to the communication device that uses the second communication number is the intermediate communication number, thus effectively avoiding a leakage of the first communication number that initiates a call. Moreover, as a binding between the intermediate communication number and the second communication number also exists, a user may know transaction information corresponding to the intermediate communication number upon receiving the call.

In implementations, the communication method may further include receiving a call request of the second communication number to the intermediate communication number, and converting the call request into a call of the second communication number to the first communication number, a current calling number provided to the first communication number being the intermediate communication number.

In implementations, a relay number for communications is set up between a first communication number and a second communication number by setting an intermediate communication number. In other words, when the first communication number calls the intermediate communication number, a communication is established between the first communication number and the second communication number. When the second communication number calls the intermediate communication number, a communication is established between the second communication number and the first communication number. Therefore, a user using the first communication number and a user using the second communication number are able to establish communications with each other through the intermediate communication number without knowing a communication number of the other party, thus effectively avoiding a leakage of the communication numbers of the users.

In implementations, the communication method may further include receiving a call request of a third communication number to the intermediate communication number, and returning call failure information to the third communication number.

In implementations, after receiving a call request, the server finds that a called number to which the call request is directed is an intermediate communication number. However, a third communication number that initiates the call request is not bound to the intermediate communication number. In this case, call failure information is returned to the third communication number. In this way, under certain situations in which the intermediate communication number is leaked, even if other users know the intermediate communication number, it is impossible to cause trouble to the user that uses the first communication number or the second communication number by calling the intermediate communication number.

Figure 14:
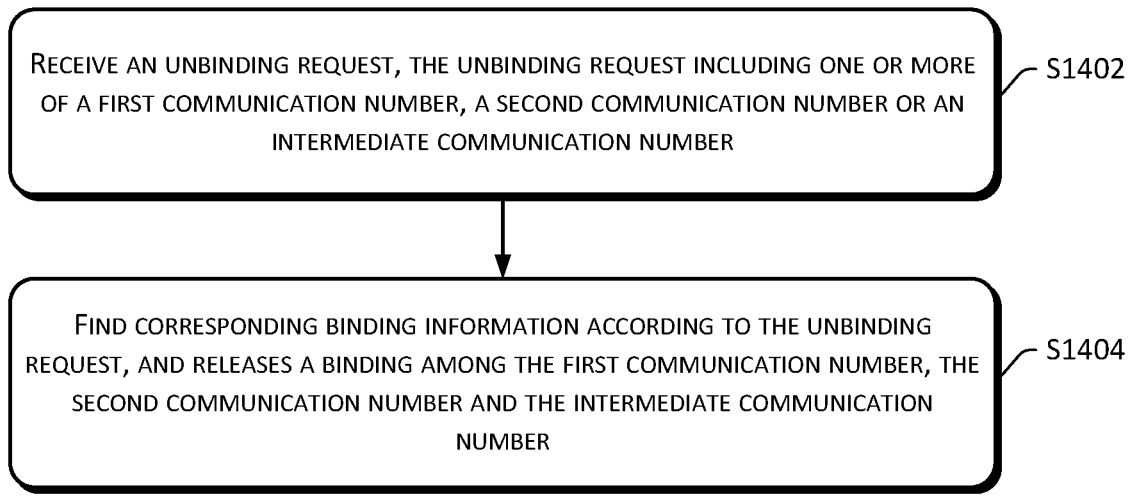
FIG. 14 is a flowchart of a communication method according to an embodiment of the present disclosure.

In implementations, the method may further include the following method blocks as shown in FIG. 14.

S1402 receives an unbinding request, the unbinding request including one or more of a first communication number, a second communication number or an intermediate communication number.

S1404 finds corresponding binding information according to the unbinding request, and releases a binding among the first communication number, the second communication number and the intermediate communication number.

In implementations, the unbinding request may be a character string having a representation of a predetermined meaning, and may also have a predetermined format. The unbinding request may be sent by a user communication device and/or a server.

In implementations, the unbinding request may include at least one of the first communication number, the second communication number or the intermediate communication number. A way of inclusion may include at least one of the first communication number, the second communication number or the intermediate communication number being a portion of content of the unbinding request, or at least one of the first communication number, the second communication number or the intermediate communication number being an attachment associated with the unbinding request. The unbinding request may further include identity information corresponding to at least one of the first communication number or the second communication number, and the identity information may be information of a user that uses a communication number. The communication number corresponding thereto can be obtained from stored data using the identity information. Based on one of the first communication number, the second communication number and the intermediate communication number, binding information corresponding to these three entities can be obtained from stored binding information, so that a binding among them can be released by deleting the binding information.

As can be seen from the technical solutions provided in the foregoing embodiments of the present disclosure, the present disclosure can achieve a binding of communication numbers of two users to an intermediate communication number. Furthermore, each user is able to establish a communication with another user by initiating a call request to the intermediate communication number, without the need of knowing a communication number of the other user. In this way, both parties can communicate with each other merely by knowing the intermediate communication number during a transaction process, thereby effectively avoiding a leakage of the communication numbers of the users and effectively protecting the privacy of the users.

Although the present disclosure has been described using exemplary embodiments, one of ordinary skill in the art can understand that many variations and changes may be made to the present disclosure without departing from the spirit of the present disclosure. It is intended that the appended claims include such variations and changes without departing from the spirit of the present disclosure.

The invention claimed is:

1. A method comprising:
receiving a query request from a basic communication server, the query request including at least one of a current calling number or an intermediate communication number, a current calling number being a communication number used by a communication device that initiates a call request to the basic communication server;
searching for target binding information corresponding to the at least one of the current calling number or the intermediate communication number included in the query request from stored binding information according to the query request, the target binding information comprising the current calling number and a called number that are bound to the intermediate communication number;
setting up number information in response to finding the target binding information, the number information at least including the called number that is included in the target binding information,
sending the number information to the basic communication server;
sending a string in a predetermined format instead of the number information to the basic communication server in response to failing to find the target binding information, the string indicating that the current calling number is not bound to the intermediate communication number;
receiving an unbinding request sent by a user communication device, the unbinding request including at least one of the current calling number, the called number, and the intermediate communication number; and
deleting stored binding information comprising the current calling number, the called number, and the intermediate communication number in response to receiving the unbinding request.

2. The method of claim 1, wherein prior to receiving the query request, the method further comprises:
receiving an intermediate communication number request;
obtaining the current calling number and the called number according to the intermediate communication number request;
allocating the intermediate communication number; and
setting up the target binding information for the calling number, the called number and the intermediate communication number.

3. The method of claim 1, further comprising:
setting up a failure event for the binding information; and
unbinding the current calling number and the called number from the intermediate communication number in response to an occurrence of the failure event.

4. The method of claim 3, wherein the failure event comprises that a current time is greater than an expiration time.

5. The method of claim 3, wherein the failure event comprises receiving an unbinding request, wherein one or more of the current calling number, the called number or the intermediate communication number is obtained according to the unbinding request.

6. A server comprising:
one or more processors;
memory;
a call request receiving module stored in the memory and executable by the one or more processors to receive a call request sent by a communication device directed to an intermediate communication number, the call request including a current calling number of the communication device;
a query request sending module stored in the memory and executable by the one or more processors to send a query request to a number management server, the query request including at least one of the current calling number or the intermediate communication number;
a number information receiving module stored in the memory and executable by the one or more processors to receive number information from the number management server, the number information including a predetermined called number;
an identification receiving module stored in the memory and executable by the one or more processors to receive a string in a predetermined format instead of the number information from the number management server, and return a call failure to the communication device, the predetermined identification indicating that the current calling number is not bound to the intermediate communication number;

a calling module stored in the memory and executable by the one or more processors to convert the call request into a call to a communication device that uses the predetermined called number, a corresponding calling number provided to the communication device being the intermediate communication number;

an information sending module stored in the memory and executable by the one or more processors to forward an unbinding request sent by a user communication device to the number management server, the unbinding request including at least one of the current calling number, the called number, and the intermediate communication number, the unbinding request being operative to cause the number management server to delete stored binding information comprising the current calling number, the called number, and the intermediate communication number in response to receiving the unbinding request.

7. The server of claim 6, wherein the call request receiving module further determines whether a current called number to which the call request is directed is the intermediate communication number.

8. The server of claim 7, wherein the call request receiving module determines whether the current called number to which the call request is directed is the intermediate communication number by:

querying whether the current called number exists in a communication number set; and recognizing the current called number as the intermediate communication number in response to finding the current called number to exist in the communication number set.

9. The server of claim 7, wherein the calling module further makes a call directly to the current called number in response to the current called number to which the call request is directed being not the intermediate communication number.

10. The server of claim 6, wherein prior to receiving the call request, further comprising a number request receiving module stored in the memory and executable by the one or more processors to receive an intermediate communication number request for allocating the intermediate communication number, and obtain the current calling number and the predetermined called number from the intermediate communication number request.

11. The server of claim 10, wherein the server further sets a failure event for the binding information, and unbinds the current calling number and the predetermined called number from the intermediate communication number in response to detecting an occurrence of the failure event.

12. The server of claim 6, further comprising:

a number allocation module stored in the memory and executable by the one or more processors to allocate the intermediate communication number; and a binding module to set up binding information for the intermediate communication number, the current calling number and the predetermined called number.

13. The server of claim 6, wherein the server further receives a call request of another communication number to the intermediate communication number, the another communication number being not bound to the intermediate communication number, and returns call failure information to a communication device that uses the another communication number.

14. One or more computer-readable media storing executable instructions that, when executed by one or more processors, cause the one or more processors to perform acts comprising:

receiving correlation information that includes a first communication number, a second communication number and an intermediate communication number;

correlating the intermediate communication number with the first communication number and the second communication number;

receiving a first call request from a communication device that uses the first communication number to the intermediate communication number;

determining whether the first communication number is bound with the intermediate communication number depending on whether number information or a string in a predetermined format is received from a number management server;

converting, upon determining that the first communication number is bound with the intermediate communication number, the first call request of the first communication number into a first call of the first communication number to the second communication number, a first calling number provided to the second communication number being the intermediate communication number;

returning, upon determining that the first communication number is not bound with the intermediate communication number, call failure information to the communication device that uses the first communication number;

receiving an unbinding request from a user communication device, the unbinding request including at least one of the first communication number, the second communication number and the intermediate communication number; and deleting stored binding information comprising the first communication number, the second communication number, and the intermediate communication number in response to receiving the unbinding request.

15. The one or more computer-readable media of claim 14, wherein the acts further comprise:

receiving a second call request of the second communication number to the intermediate communication number; and converting the second call request into a second call of the second communication number to the first communication number, a second calling number provided to the first communication number being the intermediate communication number.

* * * * *